US012585871B2

(12) United States Patent　(10) Patent No.: US 12,585,871 B2

Garapati et al.　(45) **Date of Patent: *Mar. 24, 2026**

(54) NARRATIVE GENERATION FOR SITUATION EVENT GRAPHS

(71) Applicant: BMC Software, Inc., Houston, TX (US)

(72) Inventors: Sai Eswar Garapati, San Jose, CA (US); Erhan Giral, Danville, CA (US); Benoit Christian Bernard Souche, San Jose, CA (US)

(73) Assignee: BMC Helix, Inc., Houston, TX (US)

( * ) Notice: Subject to any disclaimer, the term of this patent is extended or adjusted under 35 U.S.C. 154(b) by 68 days.

This patent is subject to a terminal disclaimer.

(21) Appl. No.: 18/478,933

(22) Filed: Sep. 29, 2023

(65) Prior Publication Data

US 2025/0111150 A1　Apr. 3, 2025

Related U.S. Application Data

(60) Provisional application No. 63/580,672, filed on Sep. 5, 2023.

(51) Int. Cl.
*G06F 40/20* (2020.01)
*G06F 16/901* (2019.01)

(52) U.S. Cl.
CPC .......... *G06F 40/20* (2020.01); *G06F 16/9024* (2019.01)

(58) Field of Classification Search
USPC ...................................................... 704/1–504
See application file for complete search history.

(56) References Cited

U.S. PATENT DOCUMENTS

| | | | |
|---|---|---|---|
| 11,281,982 B2 * | 3/2022 | Cristache | G06V 20/52 |
| 11,731,273 B2 * | 8/2023 | Cristache | G06N 3/0442 |
| | | | 700/250 |
| 12,287,641 B2 * | 4/2025 | Cristache | G06N 20/10 |
| 2021/0224671 A1 * | 7/2021 | Cristache | G06N 5/022 |

(Continued)

OTHER PUBLICATIONS

A. Vaswani et al.: "Attention is all you need," Advances in neural information processing systems, 30, 2017, 11 pages.

(Continued)

*Primary Examiner* — Marcus T Riley
(74) *Attorney, Agent, or Firm* — Brake Hughes Bellermann LLP

(57) ABSTRACT

Described systems and techniques determine an event graph of a causal chain of events representing a situation within a network, the event graph including event text characterizing at least one event of the causal chain of events. The event graph may then be processed using a large language model that includes at least one topological context adapter that includes a graph adapter and a text adapter, including processing the event graph with the graph adapter and the event text with the text adapter. The at least one topological context adapter may be trained using existing narratives describing past situations, and/or may be trained using worklog data describing past situations and corresponding actions taken to remedy the past situations. Outputs of the graph adapter and the text adapter may be combined to generate a narrative of the situation that explains the causal chain of events and/or instructions to remedy the situation.

20 Claims, 23 Drawing Sheets

(56) References Cited

U.S. PATENT DOCUMENTS

| | | | |
|---|---|---|---|
| 2023/0054004 A1* | 2/2023 | Cristache | B25J 9/1635 |
| 2023/0102002 A1* | 3/2023 | Garapati | G06N 5/01 |
| | | | 709/223 |
| 2023/0112401 A1* | 4/2023 | Cristache | B25J 5/007 |
| | | | 701/22 |
| 2023/0418287 A1* | 12/2023 | Cristache | G07C 9/00174 |
| 2025/0077851 A1* | 3/2025 | Garapati | G06N 3/0499 |
| 2025/0111150 A1* | 4/2025 | Garapati | G06F 40/30 |
| 2025/0164996 A1* | 5/2025 | Cristache | B60L 53/57 |
| 2025/0165716 A1* | 5/2025 | Cristache | G06F 40/30 |

OTHER PUBLICATIONS

E. Hu et al: "Low-Rank Adaptation of Large Language Models," arXiv preprint arXiv:2106.09685, Oct. 16, 2021, 26 pages.
J. Porter: "Millions of smartphones in UK and Japan reportedly taken offline by Ericsson equipment issue," The Verge, available online at <https://www.theverge.com/2018/12/6/18128720/02-down-softbank-outage-ericsson-equipment-software-failure>, Dec. 6, 2018, 3 pages.
M. Chen et al.: "Pinpoint: Problem determination in large, dynamic internet services," Proceedings International Conference on Dependable Systems and Networks, IEEE, 2002, 10 pages.
M. Niepert et al.: "Learning convolutional neural networks for graphs," Proceedings of The 33rd International Conference on Machine Learning, PMLR 48:2014-2023, 2016, 10 pages.
R. Boutaba et al.: "A comprehensive survey on machine learning for networking: evolution, applications and research opportunities," Journal of Internet Services and Applications, 9(1), Jun. 21, 2018, 99 pages.
S. Hochreiter et al: "Gradient flow in recurrent nets: the difficulty of learning long-term dependencies," 2001, 15 pages.
S. Hochreiter et al: "Long short-term memory," Neural computation, vol. 9, No. 8, 1997, 32 pages.
W. Liu et al: "A Survey of Deep Neural Network Architectures and Their Applications," Neurocomputing, 234, 2017, 31 pages.
Y. Li et al: "Time-dependent representation for neural event sequence prediction," arXiv preprint arXiv:1708.00065, 2017, 11 pages.

* cited by examiner

Inference Flow
Training flow

100d Remediation Generator

Fine Tuned LLM
With Topology
Adapters
153d

Knowledge graph
126

Topology data
124

146a

Training
Engine
160d

Training

Incident Data
162D

Training

IT ticket/service
management and
IT defect/task
management
products
165

Figure 2A:
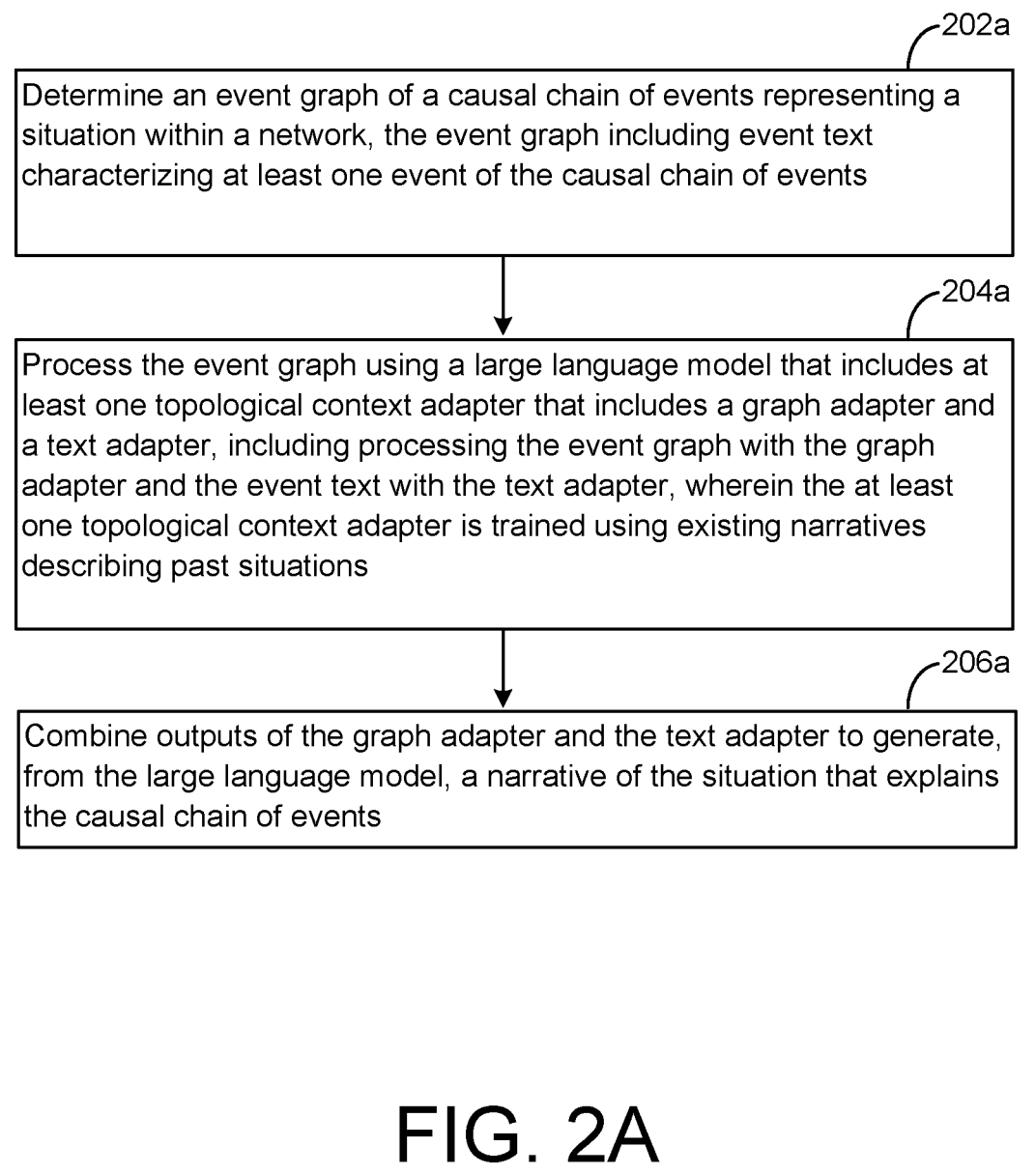

202a

Determine an event graph of a causal chain of events representing a situation within a network, the event graph including event text characterizing at least one event of the causal chain of events 204a Process the event graph using a large language model that includes at least one topological context adapter that includes a graph adapter and a text adapter, including processing the event graph with the graph adapter and the event text with the text adapter, wherein the at least one topological context adapter is trained using existing narratives describing past situations 206a Combine outputs of the graph adapter and the text adapter to generate, from the large language model, a narrative of the situation that explains the causal chain of events

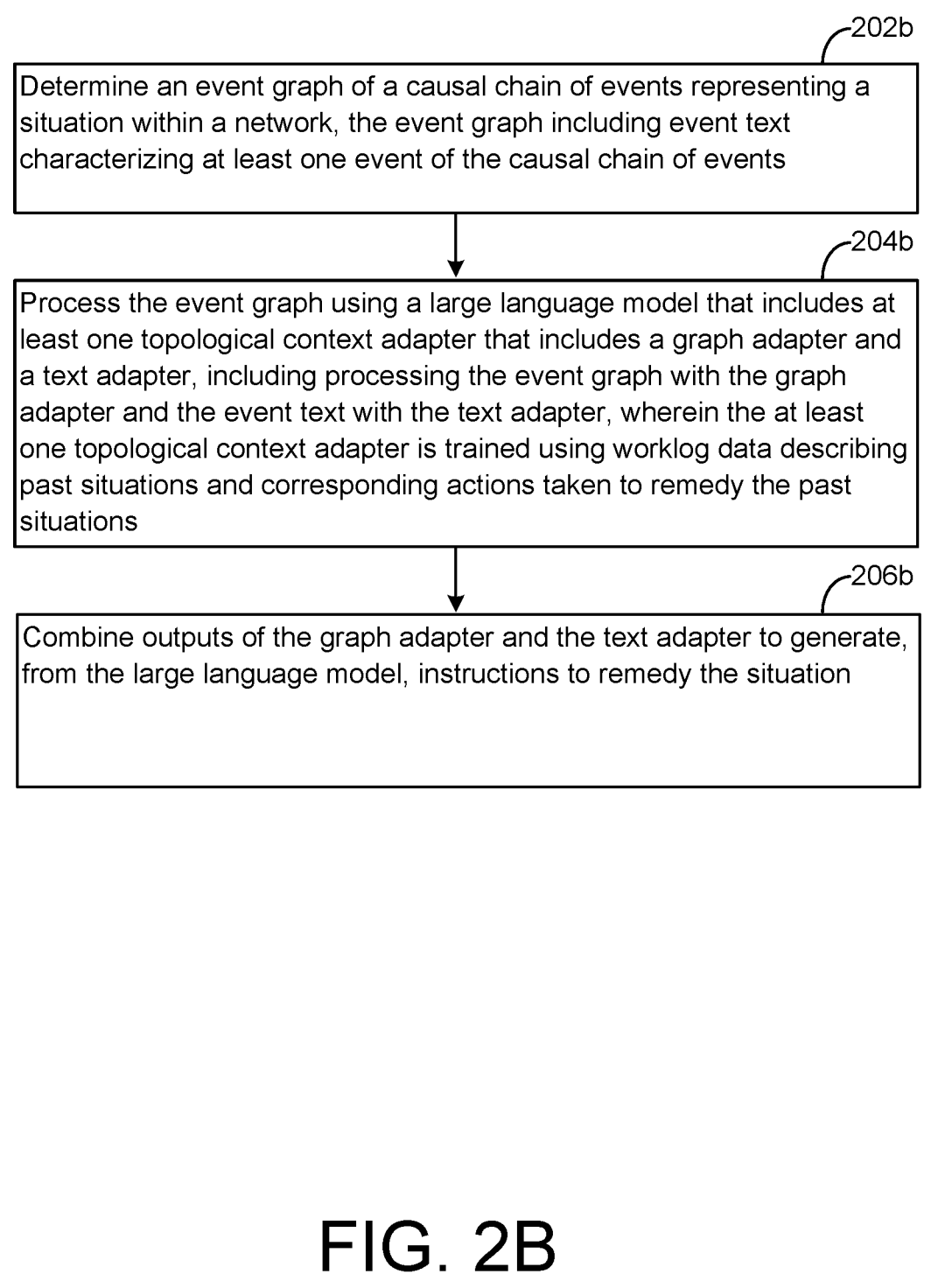

Determine an event graph of a causal chain of events representing a situation within a network, the event graph including event text characterizing at least one event of the causal chain of events 204b Process the event graph using a large language model that includes at least one topological context adapter that includes a graph adapter and a text adapter, including processing the event graph with the graph adapter and the event text with the text adapter, wherein the at least one topological context adapter is trained using worklog data describing past situations and corresponding actions taken to remedy the past situations 206b Combine outputs of the graph adapter and the text adapter to generate, from the large language model, instructions to remedy the situation

FIG. 2B

⚠ Application Browser Response time was very slow
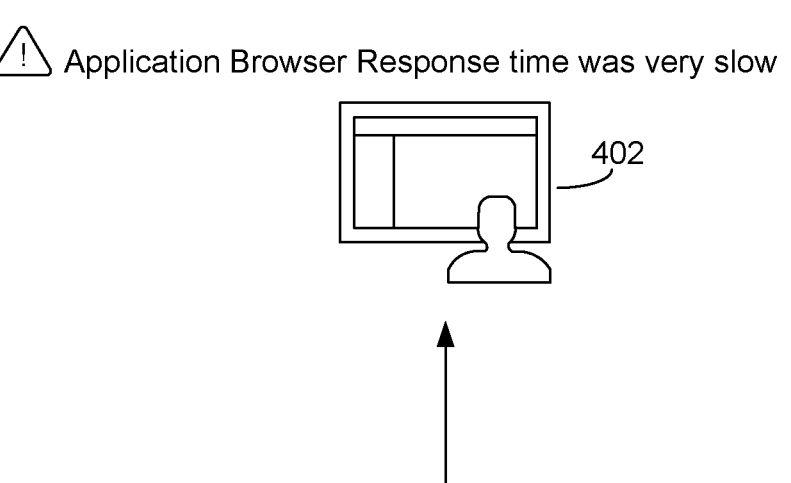
402
⚠ Database queries per interval Is low
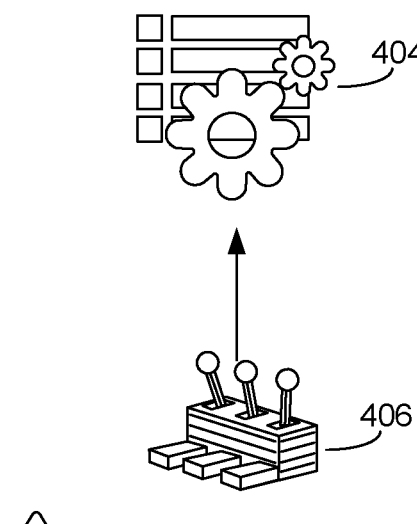
404
⚠ Network Bandwidth Utilization is high
406
FIG. 4

Figure 11A:
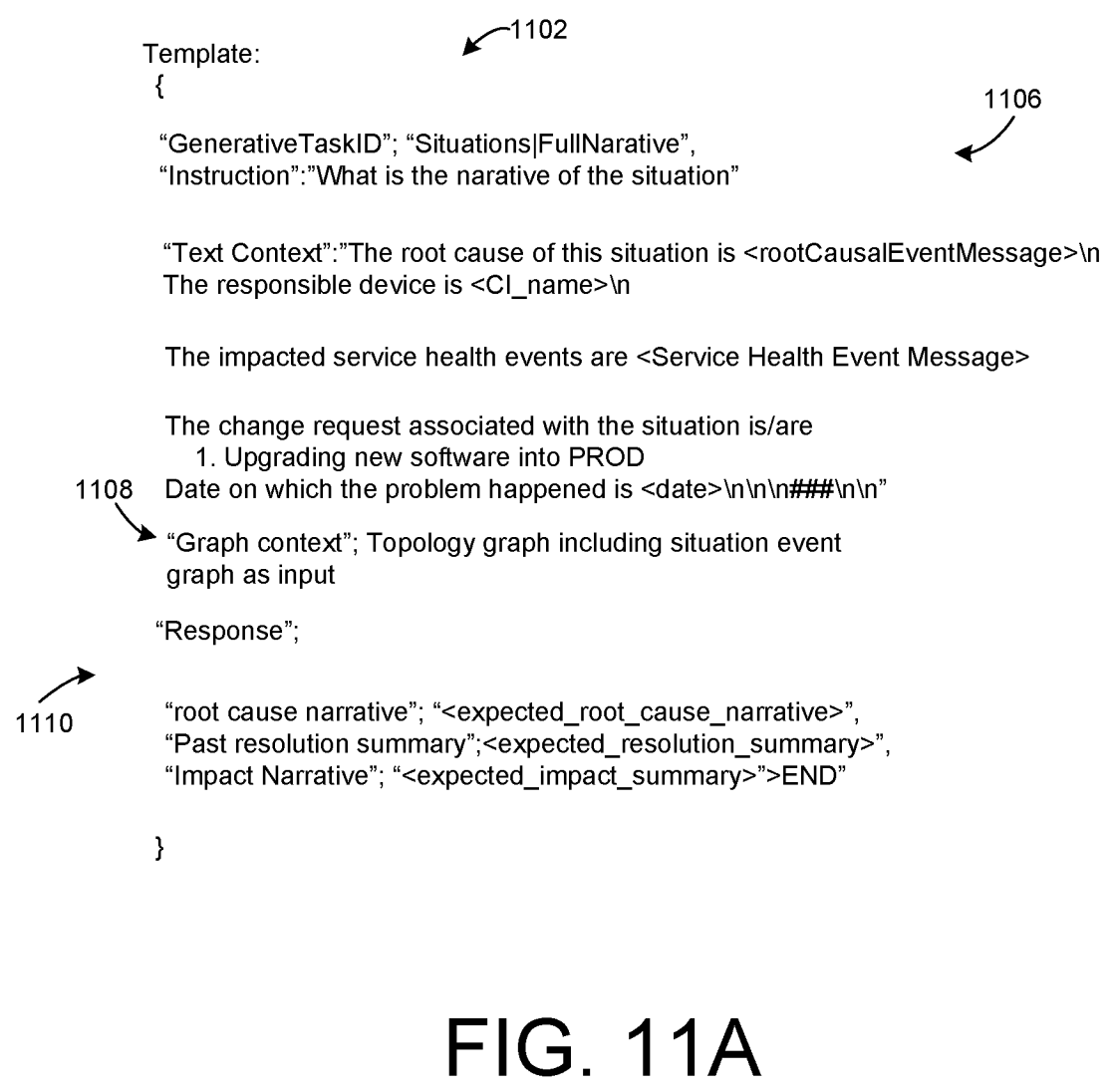

Template:
{

"GenerativeTaskID"; "Situations|FullNarrative",
"Instruction":"What is the narrative of the situation" 1106

"Text Context":"The root cause of this situation is <rootCausalEventMessage>\n
The responsible device is <CI_name>\n The impacted service health events are <Service Health Event Message>

The change request associated with the situation is/are
   1. Upgrading new software into PROD
Date on which the problem happened is <date>\n\n\n###\n\n" 1108

"Graph context"; Topology graph including situation event
graph as input

"Response";

"root cause narrative"; "<expected_root_cause_narrative>" ,
"Past resolution summary";"<expected_resolution_summary>" ,
"Impact Narrative"; "<expected_impact_summary>">END" 1110

Figure 11B:
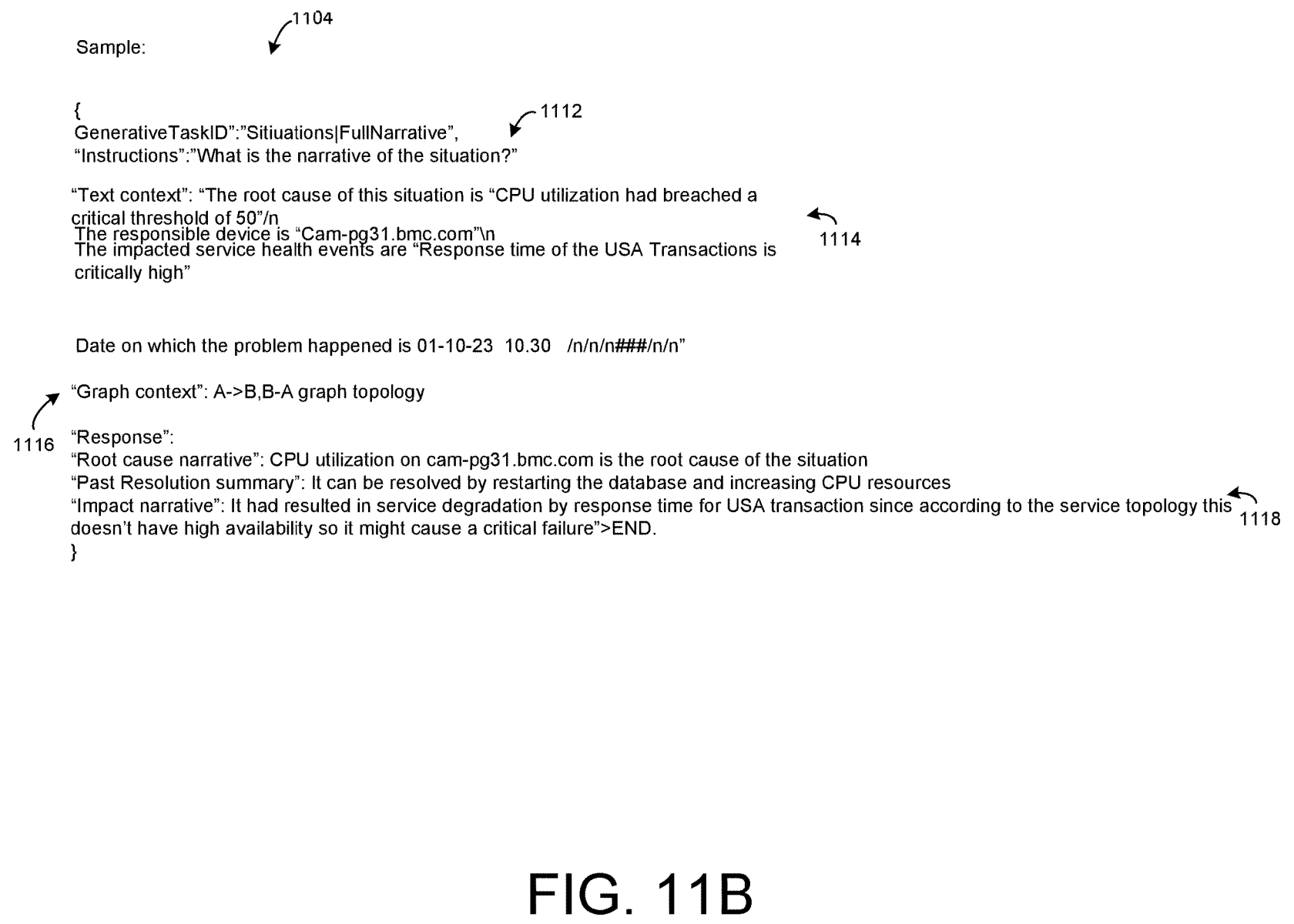

Sample:    ⌐1104

{

GenerativeTaskID":"Sitiuations|FullNarrative",    ⌐1112

"Instructions":"What is the narrative of the situation?"

"Text context": "The root cause of this situation is "CPU utilization had breached a    ⌐1114
critical threshold of 50"/n
The responsible device is "Cam-pg31.bmc.com"\n
The impacted service health events are "Response time of the USA Transactions is
critically high"

Date on which the problem happened is 01-10-23  10.30   /n/n/n###/n/n"

"Graph context": A->B,B-A graph topology

⌐1116

"Response":

"Root cause narrative": CPU utilization on cam-pg31.bmc.com is the root cause of the situation "Past Resolution summary": It can be resolved by restarting the database and increasing CPU resources "Impact narrative": It had resulted in service degradation by response time for USA transaction since according to the service topology this    ⌐1118
doesn't have high availability so it might cause a critical failure">END.

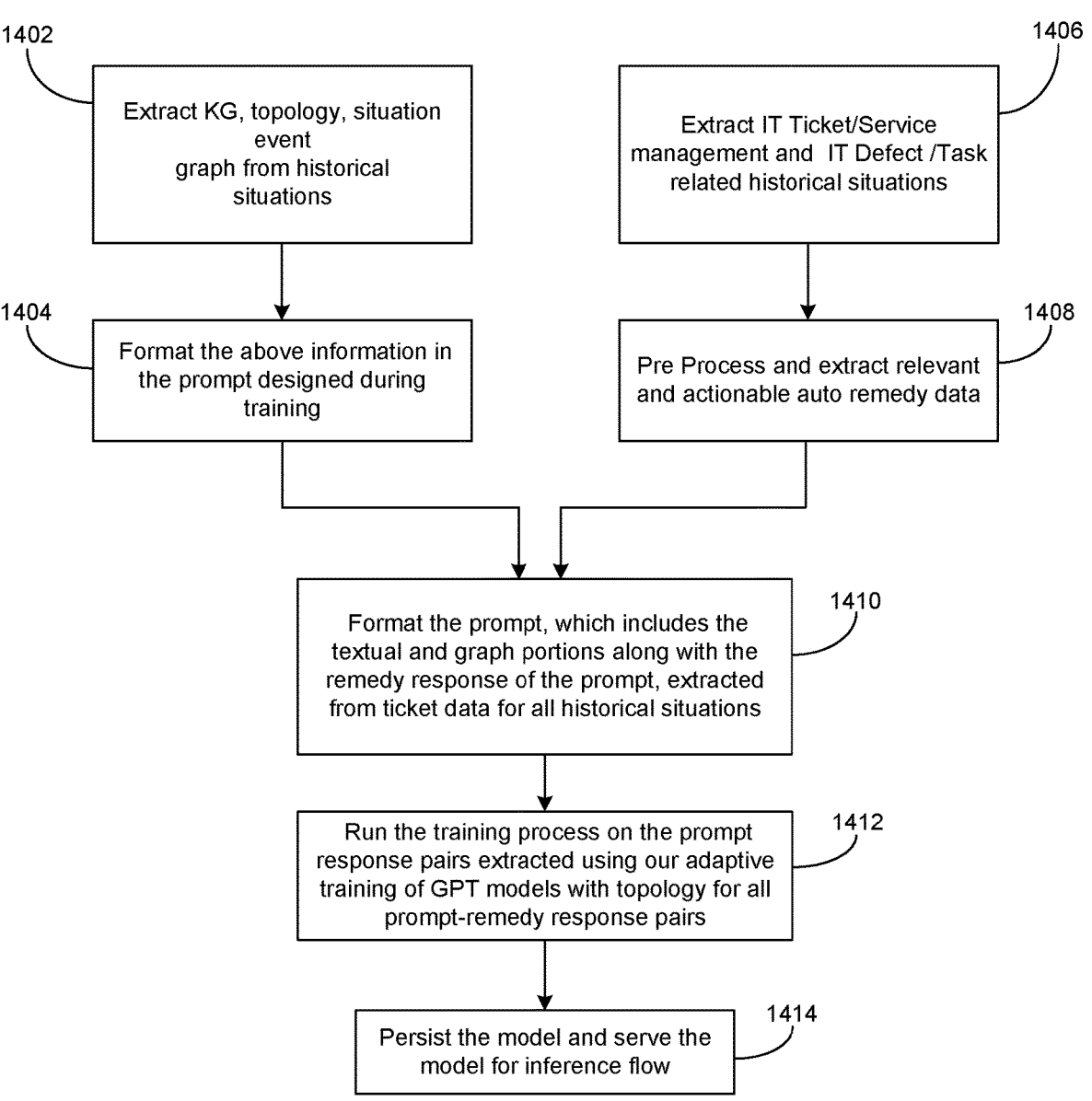

1402

Extract KG, topology, situation event
graph from historical
situations

1406

Extract IT Ticket/Service
management and IT Defect /Task
related historical situations

1404

Format the above information in
the prompt designed during
training

1408

Pre Process and extract relevant
and actionable auto remedy data

1410

Format the prompt, which includes the
textual and graph portions along with the
remedy response of the prompt, extracted
from ticket data for all historical situations

1412

Run the training process on the prompt
response pairs extracted using our adaptive
training of GPT models with topology for all
prompt-remedy response pairs

1414

Persist the model and serve the
model for inference flow

FIG. 14

Extract KG  Topology, situation Event graph from situation — 1502

Format the above information in the prompt designed during Training — 1504

Feed the prompt, which includes the textual and graph portions to the fine turned ATGPT model — 1506

Generate the Auto Remedy from the ATGPT model and parse the response. — 1508

Consume the ATGPT Remedy response — 1510

```
{
    "nodes":{
        "cc9e643a52bcfa4215660c6574776f726b74657266616365":{
            "kind":"NetworkInterface",
            "id":"cc9e1a643a52bcfa4215660c6e4e6574776f726b496e74657266616365"
            ,
            "kindicon":"Networkinterface",
            "name":"Ethernet 1/40 on sw-rd-wt-dist-ind-pun5-03",
            "attributes":{
                "type":null
            }                                                    1702
            "removed":false,                                      )
            "maxserverity":{                                     ↙
                "1693417899325":1.0
            }
            "events":0,
            "situationscores"0,
            "serviceNode":false
            "groupNode":false
            "model_defs":[{
                "id":"b99e1a6454781ea35a7631cb6e4d6f64656c44656669
                6e6974696f6e",
         }]     "name":"core Network"
            "short_name":"Ethernet1/40",
            "user_saved":false

}

},
    "links":[                                                            1704
        {                                                                 )
            "kind":cloudservice",                                        ↙
            "rel_id":f0ff11648c520fba5f15a93d72436c6f756453657276 69365",
            "src_id":f0ff11648c520fba5f15a93b6e436c6f756453657276696365",
            "tgt_id":"f0ff11648c520fba5f15a92e6e436c6f7564526567696f6e"
        },
        {

"kind":"Communication",
            "rel_id":"cc9e1a643a52bcfa422ccd9a72436f6d6d756e69636174696f6e",
            "src_id":"cc9e1a643a52bcfa422c8f006e536f667477617265496e7374616e6365",
            "tgt-id":cc9e1a643a52bcfa421cb92f6e536f667477617265496e7374616e6365
        }
        }

NARRATIVE GENERATION FOR SITUATION EVENT GRAPHS

CROSS-REFERENCE TO RELATED APPLICATION

This application claims benefit, under 35 U.S.C. § 119, of U.S. Provisional Patent Application No. 63/580,672, filed on Sep. 5, 2023, 2020, entitled "NARRATIVE AND REMEDIATION GENERATION FOR SITUATION EVENT GRAPHS", the disclosure of which is incorporated by reference herein in its entirety.

TECHNICAL FIELD

This description relates to network event management.

BACKGROUND

Many companies and other entities have extensive technology landscapes that include numerous Information Technology (IT) assets, including hardware and software. It is often required for such assets to perform at high levels of speed and reliability, while still operating in an efficient manner. For example, various types of computer systems are used by many entities to execute business-critical applications and high volumes of data processing, across many different workstations and peripherals.

Various types of system monitoring methods are used to detect, predict, prevent, mitigate, or cure system faults that might otherwise disrupt or prevent monitored IT assets from achieving system goals. For example, it is possible to monitor various types of performance metrics characterizing aspects of system performance. When monitored values of the detected performance metrics exceed a predetermined threshold, the monitored values may be considered potentially indicative of a current or future system malfunction, and responsive action may be taken.

For the types of extensive technology landscapes referenced above, it may occur that a plurality of events may occur within a given period of time. Various ones of the events may be related to one another. For example, one event may cause a chain reaction involving multiple other events.

Such a chain or cluster of events may be expressed or represented as a graph, such as a directed graph in which event nodes are connected by causal edges. In many cases, such graphs may be complex and/or difficult to interpret or understand. For example, such graphs may include or represent implicit information that a non-expert user may not recognize. In other examples, such graphs may require external information to be interpreted correctly, such as information about a larger context (e.g., network topology) in which the chain of events occurred.

For these and other reasons, existing network event management tools are often unable to adequately understand events that occur within a network. As a result, such existing tools may be unable to respond to, remediate, predict, or prevent undesired network events.

SUMMARY

According to one general aspect, a computer program product may be tangibly embodied on a non-transitory computer-readable storage medium and may comprise instructions. The instructions, when executed by at least one computing device, may be configured to cause the at least one computing device to determine an event graph of a causal chain of events representing a situation within a network, the event graph including event text characterizing at least one event of the causal chain of events. The instructions, when executed by the at least one computing device, may be configured to cause the at least one computing device to process the event graph using a large language model that includes at least one topological context adapter that includes a graph adapter and a text adapter, including processing the event graph with the graph adapter and the event text with the text adapter, wherein the at least one topological context adapter is trained using existing narratives describing past situations. The instructions, when executed by the at least one computing device, may be configured to cause the at least one computing device to combine outputs of the graph adapter and the text adapter to generate, from the large language model, a narrative of the situation that explains the causal chain of events.

According to another general aspect, a computer program product may be tangibly embodied on a non-transitory computer-readable storage medium and may comprise instructions. The instructions, when executed by at least one computing device, may be configured to cause the at least one computing device to determine an event graph of a causal chain of events representing a situation within a network, the event graph including event text characterizing at least one event of the causal chain of events. The instructions, when executed by the at least one computing device, may be configured to cause the at least one computing device to process the event graph using a large language model that includes at least one topological context adapter that includes a graph adapter and a text adapter, including processing the event graph with the graph adapter and the event text with the text adapter, wherein the at least one topological context adapter is trained using worklog data describing past situations and corresponding actions taken to remedy the past situations. The instructions, when executed by the at least one computing device, may be configured to cause the at least one computing device to combine outputs of the graph adapter and the text adapter to generate, from the large language model, instructions to remedy the situation.

According to other general aspects, computer-implemented methods may perform the instructions of the computer program products. According to other general aspects, a system, such as a mainframe system or a distributed server system, may include at least one memory, including instructions, and at least one processor that is operably coupled to the at least one memory and that is arranged and configured to execute instructions that, when executed, cause the at least one processor to perform the instructions of the computer program products and/or the operations of the computer-implemented methods.

The details of one or more implementations are set forth in the accompanying drawings and the description below. Other features will be apparent from the description and drawings, and from the claims.

BRIEF DESCRIPTION OF THE DRAWINGS

FIG. 2A is a flowchart illustrating example operations of the systems of FIG. 1A during situation event graph narrative generation.

FIG. 2B is a flowchart illustrating example operations of the system of FIG. 1A for remediation generation.

FIG. 4 illustrates a second example contextual situation event graph.

FIG. 11A illustrates a template for training operations in the example of FIG. 10.

FIG. 11B illustrates a sample response for training operations in the example of FIG. 10, corresponding to the template of FIG. 11A.

FIG. 14 is an example flowchart illustrating operations for training a large language model to generate a remediation using the example transformer layers of FIGS. 7-9.

FIG. 17 illustrates an example topological input into the system of FIG. 1A.

DETAILED DESCRIPTION

Figure 1A:
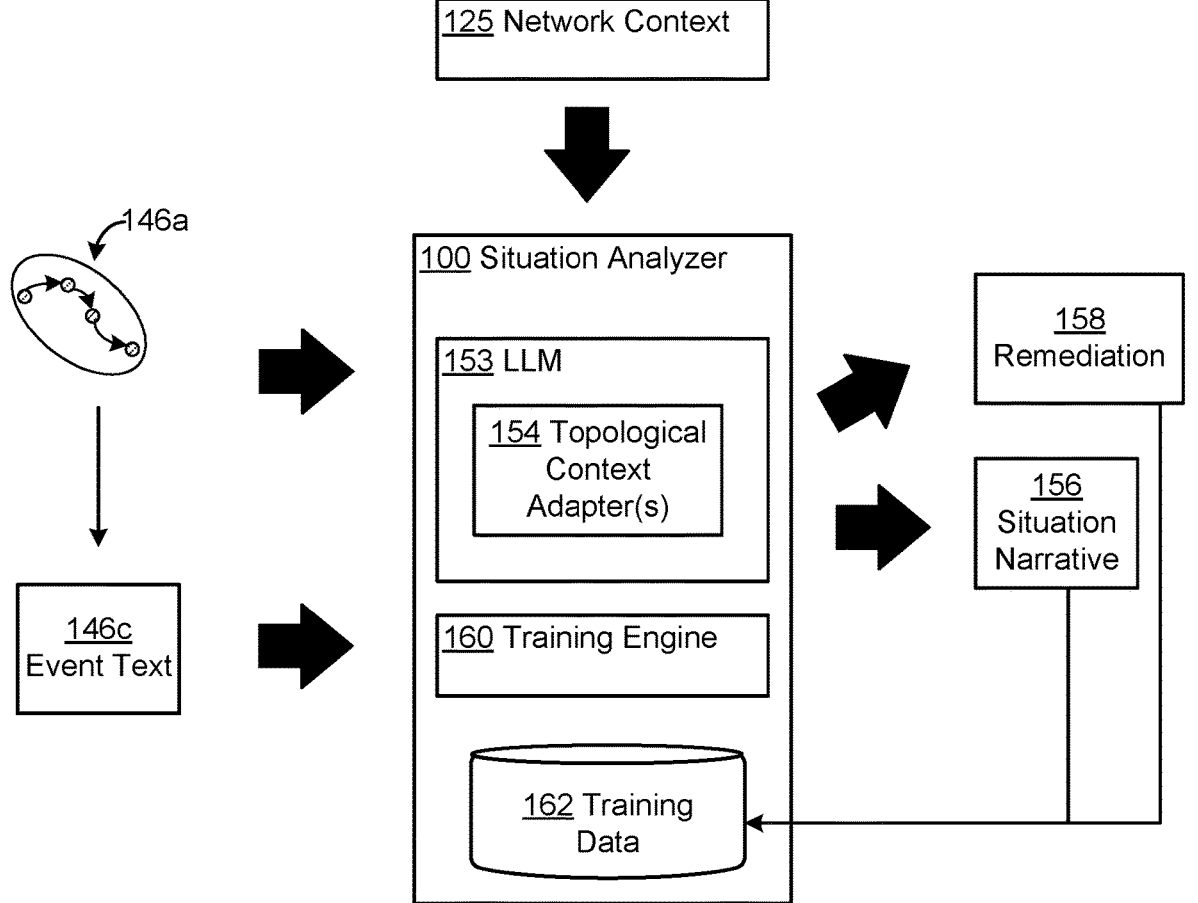
FIG. 1A is a block diagram of a system for processing situation event graphs narrative and remediation generation.

Sustaining the stability and reliability of large-scale networks has been an important need in the IT management area. It is challenging, however, to provide such stability and reliability in a practical IT environment, due to the dynamic, ever-growing, and distributed nature of large-scale enterprise networks. Effective management of such environments typically requires an in-depth understanding of multiple domains to communicate and resolve the problem(s).

Given the volume of information required for large, high-availability systems, it can be advantageous to determine summaries of various events and situations that occur, so that the events and situations may be understood in an effective, efficient manner by a large audience of IT professionals. For example, existing large language models (LLM) and other machine learning (ML) techniques may be used to input a volume of text and output a smaller volume (summary) of the input text. However, available techniques for summarization primarily or solely provide summaries of textual information that may be included, e.g., in failure reports or other monitoring outputs, and which generally fail to capture or characterize relationships between events in a comprehensive or cohesive manner.

Similarly, it is desirable to generate remediations for incidents that occur in such large, high-availability IT systems, e.g., approaches or operations that may be used to repair or resolve problems that users or operators of an IT system may experience. Such incidents are typically associated with worklogs or other textual records that include problem descriptions received from users/operators, as well as steps taken by agents or other operators tasked with resolving such problems. It is possible to try to automatically determine a remediation by matching existing remediations (e.g., remediation scripts and/or remediation summaries) with new/current incidents. However, as with existing approaches to event summarization, existing approaches for determining remediations may fail to consider relationships between various IT components and other factors that may distinguish seemingly similar incidents/remediations, so that remediations may be prone to address symptoms without addressing underlying causes. Moreover, existing approaches for generating remediations may be prone to providing, at best, high-level, generic suggestions for solutions that do not provide sufficiently actionable instructions for agents or other incident handlers. Thus, existing techniques for summarization, based on event-related textual data, do not provide adequate solutions with respect to an event(s) context that may be distributed across multiple devices and over multiple domain topologies.

Described techniques consider both a graphical representation of a situation that includes multiple network events, as well as textual descriptions of such network events. Consequently, described techniques provide a narrative of a situation of events that provides reasoning and explanation with respect to a root cause of the situation (e.g., determined from relationships among events and underlying components), while also considering possible or likely impact(s) of multiple related events within and among various domain topologies.

As further referenced above, effective automatic remediation of IT situations is highly desired for high-availability systems and other network scenarios and use cases, but auto-remediation based only on worklogs, incident tickets, and textual data of events does not obtain or provide a context distributed across several devices or among multiple domain topologies. Therefore, described techniques provide systems for recommending an automatic and/or actionable remediation for a root cause and associated impact(s) of numerous events in various domain topologies. As a result, IT teams may focus efforts on resolving an underlying issue, rather than simply addressing symptoms, thereby obtaining more efficient and effective problem resolutions.

Described techniques automatically generate such narratives and remediations across different services, devices, and other IT components, within and among multiple domains that may span a varied topology, by adaptively training a LLM model using a situation event graph that includes topological and textual data. A situation event graph narrative may thus be enhanced through consideration of topological data across multiple domains, services, and devices.

For example, described techniques include capturing a textual and spatio-temporal context from situation causal event graphs. A customized LLM algorithm, which may be based on, e.g., a Generative Pretrained Transformer (GPT), may thus be trained to determine a relevant context, not just from a context of an individual event, but also from the context of surrounding events, as well as a topology context and temporal context of the situation. In this way, the customized LLM algorithm may be configured to generate a human-readable narrative and/or remediation that can be focused not only on the root cause and symptoms, but also on relevant topological characteristics of the IT system. Described custom LLMs may be utilized by various types of situation or incident detector(s) or handler(s) to generate accurate and comprehensive narratives, as well as helpful and actionable remediations, in a process(es) that may be adapted continuously to provide up-to-date solutions.

Put another way, automatic narrative generation and/or automatic remediation generation may be obtained by adaptive training from extracted context for a situation event graph that includes not only textual event context but also context from surrounding events, topology context, and/or temporal context of a larger situation. As a result, a human-readable narrative focused not only on the root cause and symptoms, but also on the topological characteristics, may thus be generated.

Described processes may be implemented continuously, and summaries and/or remediations may be automatically updated whenever new patterns and trends emerge, e.g., as new types of devices are discovered in the IT environment. Such an automatic approach facilitates narrative and/or remediation generation in an adaptive and accurate manner (s).

In FIG. 1A, an example event graph 146a (also referred to as an event cluster, or a situation) is illustrated as a graph of multiple events. A more detailed example of the event graph 146a is provided below, e.g., with respect to FIG. 1B. The event graph 146a, may be associated with event text 146c, such as descriptive text. The event text 146c is illustrated separately in the simplified example of FIG. 1A, but should be understood to be included in, or determined with respect to, one or more individual events of the situation 146a.

A situation analyzer 100 may be configured to input the event graph 146a and the event text 146c, perhaps with relevant network context 125, for processing by the type of large language model (LLM) 153 based on the GPT, referenced above. For example, the network context 125 may include network topology data and/or knowledge graph data that may be relevant to the event graph 146a and associated event text 146c.

As further illustrated, the LLM 153 may include one or more topological context adapter(s) 154, and may be configured to process, e.g., the event graph 146a and associated event text 146c, along with the network context 125, to generate a corresponding situation narrative 156, which may include root cause identification and explanation for the event graph 146a. In other example implementations, the LLM 153, including the topological context adapter(s) 154, may be configured to process, e.g., the event graph 146a and associated event text 146c, along with the network context 125, to generate a corresponding remediation for a root cause of the processed event graph 146a.

As described in detail, below, the topological context adapter 154 may be trained using a training engine 160 and associated training data 162 to enable the topological context adaptor(s) 154 to provide a desired outcome, such as the situation narrative 156 or the remediation 158. For example, when training for generating the situation narrative 156, the training data 162 may include previously determined narratives associated with similar or related event graphs and associated situations, including root cause identification and explanation. When training for generating actionable remediations for resolving situations, the training data 162 may include previously determined remediations, worklogs, and other data associated with resolving previous IT situations.

As shown in FIG. 1A, when the topological context adaptor(s) 154 are trained to generate the situation narrative 156, the resulting situation narrative 156 may be included in subsequent versions of the training data 162, perhaps after human review, modification, and training, for continuous adaptation and customization of the topological context adapter(s) 154, and thus of the LLM 153 as a whole. Similar comments apply when the topological context adaptor(s) 154 are trained to generate the remediation 158, which may, in those scenarios, be fed back to the training data 162 to obtain up-to-date, accurate, and evolving remediations for future situations.

Figure 1B:
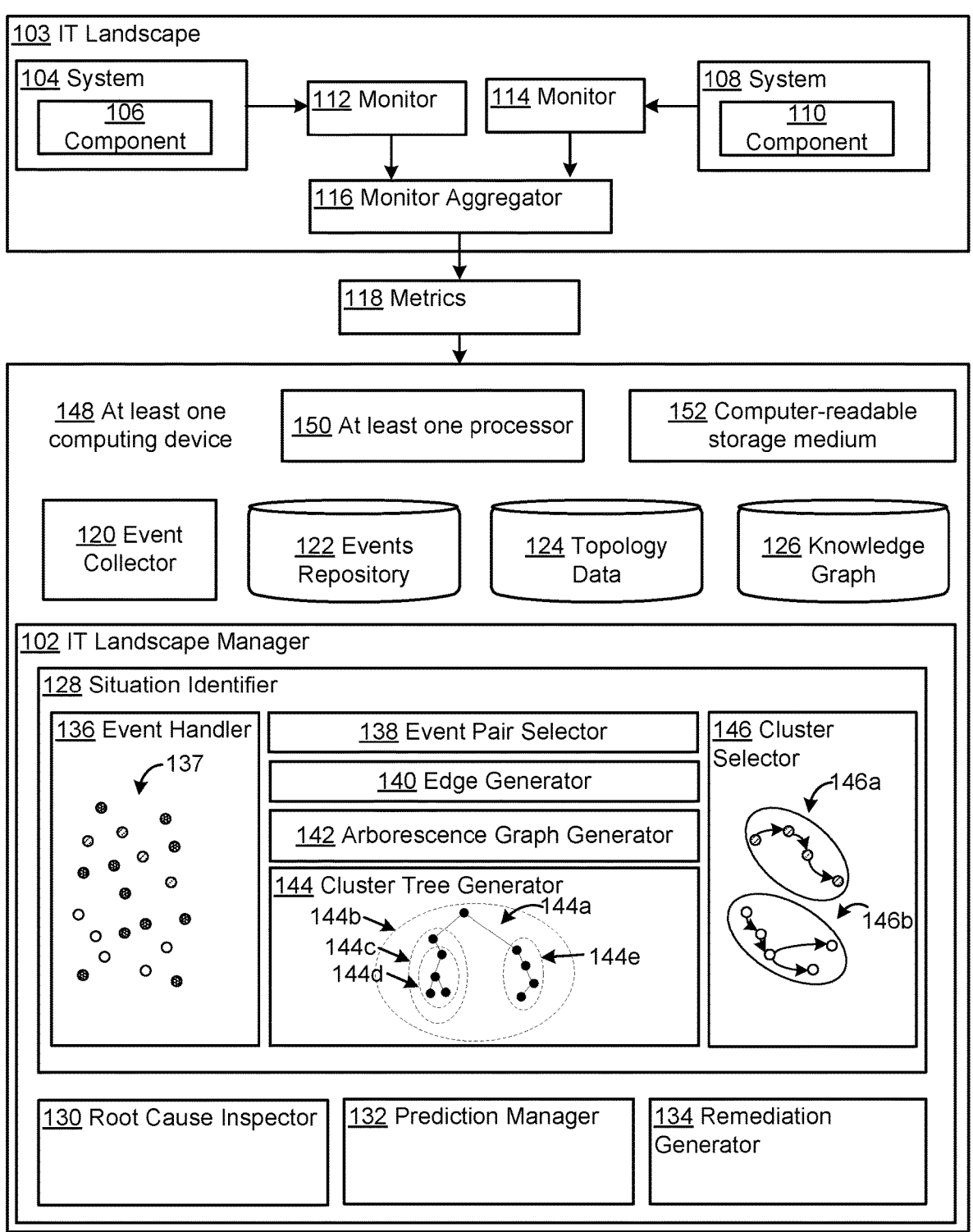
FIG. 1B is a block diagram illustrating an example implementation for generating situation event graphs for use in the system of FIG. 1A.
Figure 1C:
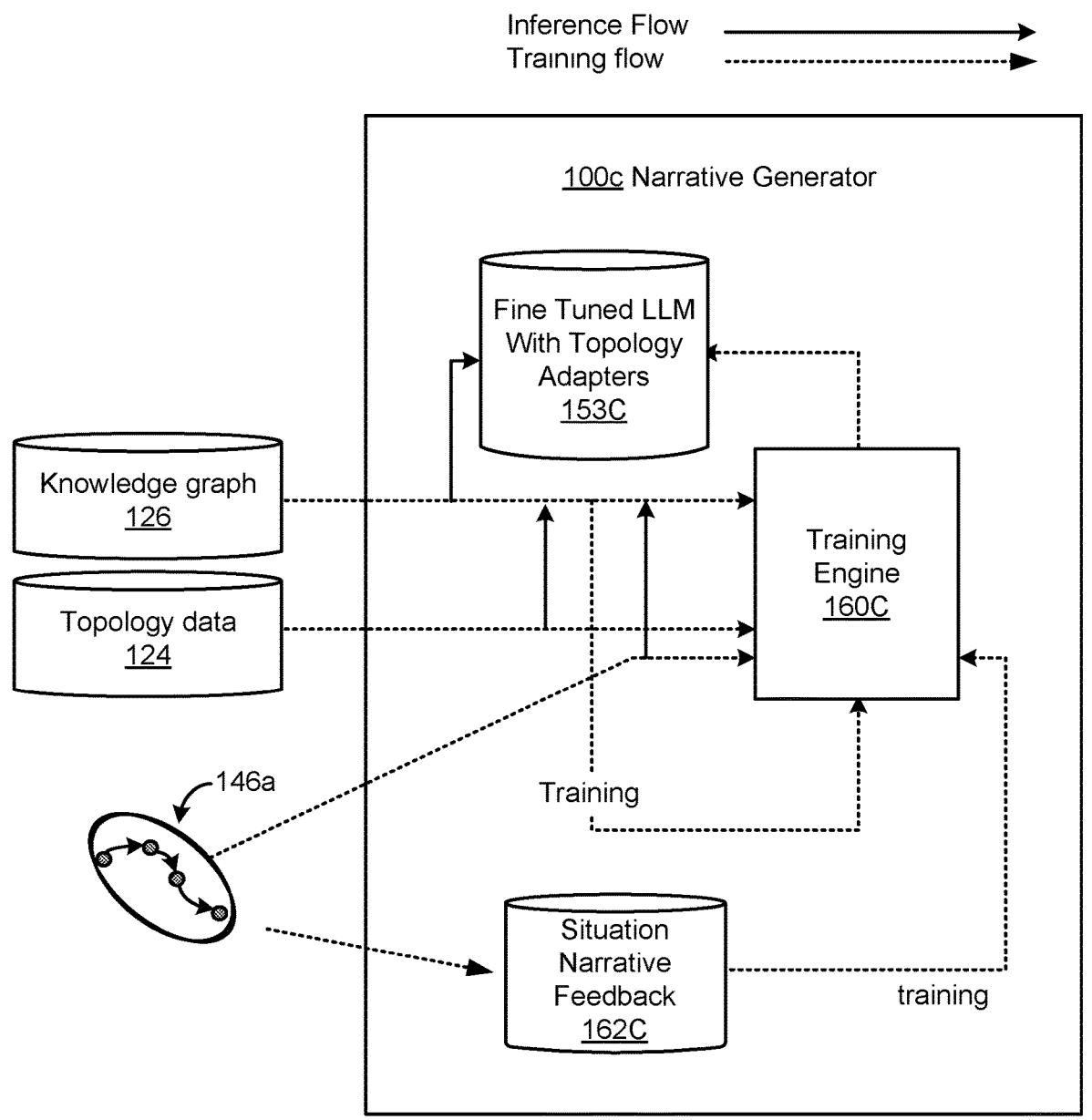
FIG. 1C is a block diagram of a more detailed example implementation of the systems of FIG. 1A and FIG. 1B for situation event graph narrative generation.
Figure 1D:
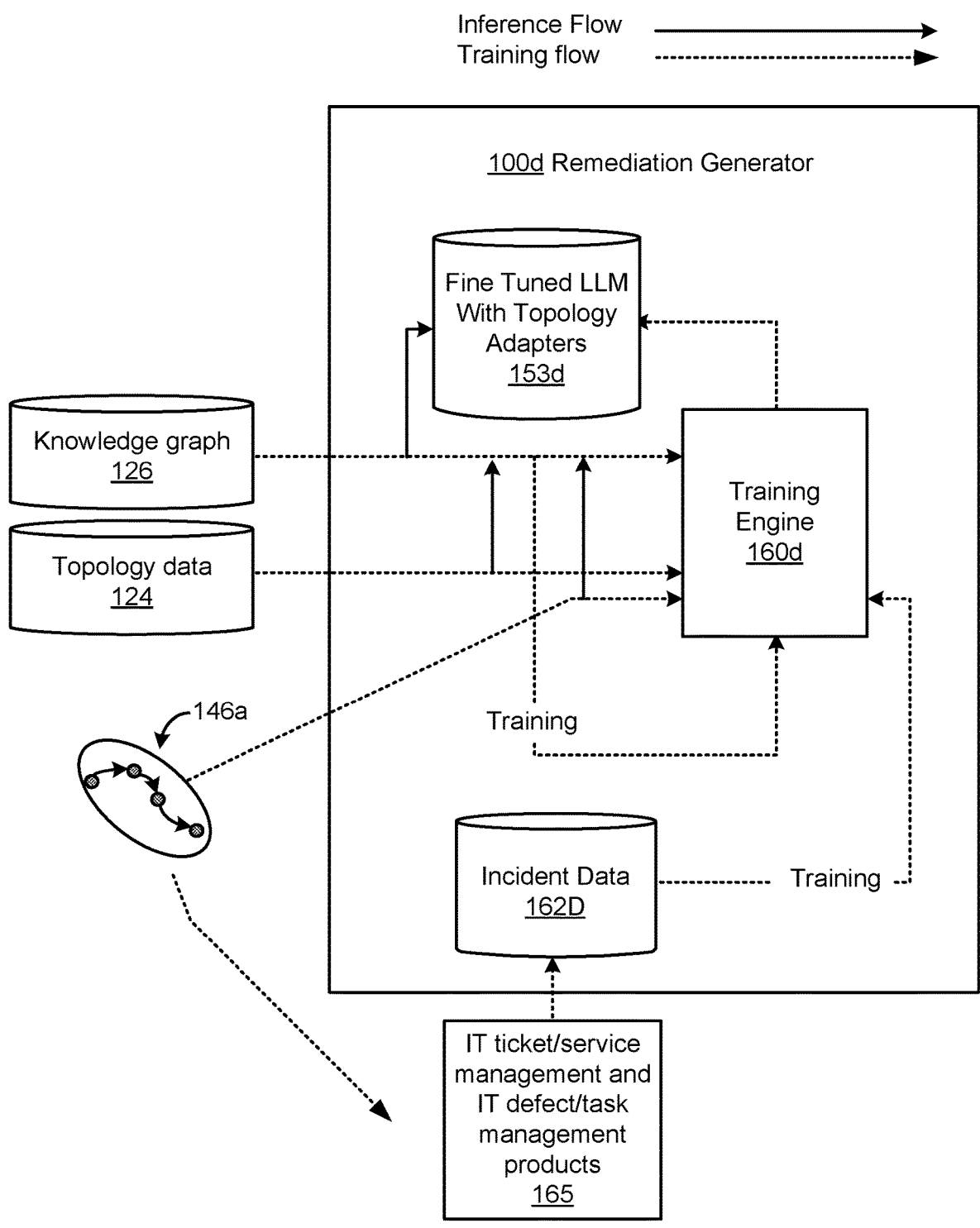
FIG. 1D is a block diagram of a more detailed example implementation of the systems of FIG. 1A and FIG. 1B for remediation generation.

FIG. 1B is a block diagram of a system for directed incremental clustering of causally related events and provides an example technique(s) for obtaining the event graph 146a to be processed by the situation analyzer 100. For example, as shown in FIG. 1C, the situation analyzer 100 may be implemented as a narrative generator configured to generate the situation narrative 156, or, as shown in FIG. 1D, the situation analyzer 100 may be implemented as a remediation generator configured to generate the remediation 158.

In the example of FIG. 1B, an IT landscape manager 102 may be configured to provide causal chain determination, root cause analysis, performance prediction, and remediation actions, and described in detail, below.

For purposes of explaining example functionalities of the IT landscape manager 102, FIG. 1B illustrates an IT landscape 103 that includes a system 104 having a component 106, which represents a plurality of components of the system 104. Similarly, the IT landscape 103 includes a system 108 having a component 110, which may itself represent many different individual components. The systems 104, 108 may represent many different types of component-based systems, and the components 106, 110 may also represent many different types of components.

By way of non-limiting examples, the systems 104, 108 may represent various types of computing environments, such as a mainframe computing environment, a distributed server environment, or any computing environment of an enterprise or organization conducting network-based IT transactions. The systems 104, 108 may include many other types of network environments, such as a private network of an enterprise.

The systems 104, 108 may also represent scenarios in which the components 106, 110 represent various types of sensors, such as internet of things devices (IoT) used to monitor environmental conditions and report on corresponding status information. For example, the system 104 may be used to monitor patients in a healthcare setting, working conditions of manufacturing equipment, or other types of machinery in many industrial settings (including the oil, gas, or energy industry), or working conditions of banking equipment, such as automated transaction machines (ATMs).

Thus, the components 106, 110 should be understood broadly to represent any component that may be used in the above and other types of systems to perform a system-related function. Such components may include various types of hardware or software components, or combinations thereof. For example, the components 106, 110 may represent any infrastructure element(s). The components 106, 110 may represent a server, a workstation, a router, or a switch, or may represent more granular hardware components, such as an individual processor or memory.

Similarly, the components 106, 110 may represent various types of software components, such as individual applications, or virtual machines. In further examples, a service may be a type of aggregated component that includes an orchestrated sequence or process of underlying hardware and software components. Many other components, including hosts, databases, or containers, may be included, some examples of which are provided below.

In some implementations, the system 104 and the system 108 may be geographically dispersed from one another. In other examples, the systems 104, 108 may be overlapping systems within a larger network, and may be co-located. Thus, the systems 104, 108 should be understood to represent virtually any IT landscape 103 that may be monitored and managed using the IT landscape manager 102.

In FIG. 1B, a monitor 112 is illustrated as monitoring the system 104, including the component 106, while the system 108 (and the component 110) may be monitored by a monitor 114. A monitor aggregator 116 may be configured to oversee and monitor the two or more monitors represented by the monitors 112, 114.

Accordingly, a plurality of metrics 118 may be obtained that provide data characterizing operations of the systems 104, 108, including, e.g., characterizations of a performance or other operations of the systems 104, 108, and of individual components 106, 110, thereof. The metrics 118 may be understood to be, for example, a sequence of metrics collected at defined intervals or timesteps. For example, the metrics 118 may be collected every second, every minute, every 10 minutes, every 30 minutes, every hour, or at any other time period set by an administrator or other user.

Accordingly, the metrics 118 may represent any type of quantified performance characterizations that may be suitable for specific types of components. The metrics 118 represent and include performance metrics providing any corresponding type(s) of data that may be captured and reported, particularly in an ongoing, dynamic fashion, for any of the above-referenced types of systems and/or components, and various other systems, not specifically mentioned here for the sake of brevity. Metrics 118 may be defined with respect to technical device or network performance, and/or characterized with respect to relevant business performance.

For example, in a setting of online sales or other business transactions, the performance metrics 118 may characterize a condition of many servers being used. In a healthcare setting, the performance metrics 118 may characterize either a condition of patients being monitored or a condition of IoT sensors being used to perform such monitoring. Similarly, the performance metrics 118 may characterize machines being monitored or IoT sensors performing such monitoring in manufacturing, industrial, telecommunications, energy, banking, or financial settings. In some examples, which may occur in mainframe, distributed server, or other networking environments, the performance metrics 118 may become or include key performance indicators also known as KPIs.

In the example of FIG. 1B, the system monitors 112, 114 are illustrated as separate components from the systems 104, 108. In various implementations, portions of the system monitors 112, 114 may be implemented within their respective systems, or within individual ones of the components 106, 110, and/or the components 106, 110 may be configured to output the metrics 118 directly.

In some implementations, monitoring may require specialized, proprietary, or otherwise configured interfaces to underlying systems or components. The monitor aggregator 116 may be configured to convert or format any monitored metrics, as needed, to provide the metrics 118 as a uniform stream of metrics for processing by the IT landscape manager 102.

In some implementations, the monitor aggregator 116 may be integrated with the IT landscape manager 102. In other implementations, e.g., if a smaller number or type of metrics is/are needed, then the IT landscape manager 102 may interface directly with the system monitors 112, 114 themselves, and the monitor aggregator 116 may be omitted.

As referenced above, the administrator or other user may wish to identify, classify, describe, or predict various network occurrences or other events. For example, such events may relate to, or describe different types of optimal or sub-optimal network behavior. For example, network characteristics such as processing speeds, available bandwidth, available memory, or transmission latencies may be evaluated. These and various other characteristics may be related to specific types of network events, such as a crash or a freeze, a memory that reaches capacity, or a resource that becomes inaccessible.

For ease of explanation, the below description is provided primarily with respect to the types of network-based examples just given. As may be appreciated from the above, however, such network examples are non-limiting, and the IT landscape manager 102 may be configured to provide similar functionalities in any of the other contexts referenced above (e.g., medical, IoT, manufacturing, or financial), and in many other contexts.

In many cases, the metrics 118 may represent extremely large quantities of data, since individual values for individual metrics may be collected at frequent time intervals. Consequently, it may be impractical or infeasible to store all such metric values. Moreover, there may be limited utility in storing metric values that are associated with normal system usage.

In the example of FIG. 1B, an event collector 120 may be configured to analyze the metrics 118 and determine whether any events are included therein, or may be determined therefrom, that may require processing by the IT landscape manager 102. In this context, the term event should be understood broadly to refer to any occurrence within the IT landscape 103 that may be determined from analysis of one or more metric value(s) of the metrics 118.

For example, a metric 118 may each be associated with a threshold value, and an event may be determined when the threshold value is exceeded (or not reached). For example, a memory being 80% full may cause a notification or alert to be generated, so that a response may be implemented to mitigate or avoid system failures. Such thresholds may be set in a static or dynamic fashion. Such thresholds may be set with respect to device or network performance requirement, and/or with respect to relevant business-performance requirements.

In other examples, the event may be determined from one or more metric values using other techniques. For example, the neural network may be trained to recognize a metric value as being anomalous in specific contexts. In other examples, the event may be determined for a particular metric value when the metric value varies to a certain extent, or in a predefined way, from historical norms for that metric value.

The event may be defined with respect to a single metric value, such as a particular memory, as just referenced, or may be defined with respect to multiple metric values. Multiple such single events may thus occur at a single timestep.

In other examples, an event may be defined with respect to a plurality or combination of variables, such as when a system crash affects multiple components. Therefore, an event may include one or more metric values and related information (e.g., generated alerts or thresholds exceeded), including specific combinations thereof.

The event collector 120 may thus be configured to determine events from the metrics 118, using any of the above techniques, or other techniques not mentioned here, or combinations thereof. The event collector 120 may store collected events within an events repository 122.

The events repository 122 may thus contain a large number of events. Each event may be stored together with any relevant information, such as timestamps or related thresholds. Various examples of events are provided and discussed below in more detail.

As referenced above, events may be isolated, correlated, or causal. Multiple or pluralities of events may occur together that have a cumulative or compounded effect(s). For example, events may occur together in the sense that they are proximate in time, close in geographical distance, and/or local to one another within a network topology. For example, two events may occur at consecutive timesteps but across a network topology, or, conversely, may occur within a single device but with multiple timesteps occurring in between.

In the following description, such pluralities of events may be referred to as event clusters. An event cluster may thus define a singular situation that has an impact on operations of one or more of the systems 104, 108. Put another way, the event may represent an alarm that may or may not require a response, while a situation may represent a problem that requires a response. Thus, a situation may include events that are aggregated based on various factors, including, e.g., occurrence, message, threshold exceeded, and/or topology.

For example, in a simplified example, a server may have a required response time. If the server exceeds the required response time, then the event may be detected by the event collector 120 and stored in the events repository 122. If no other component requires a response from the server during the response time requirement, then there may not be a downstream effect other than the delayed response itself. On the other hand, if another downstream component does require a response from the server during the response time requirement, then the operations of that component may be delayed and may cause other undesired effects.

Topology data 124 represents any data that reflects or describes network topologies associated with the systems 104, 108. In some cases, topology data 124 may include relatively static topology data that may be captured and stored for use by the IT landscape manager 102 as described herein. In many cases, however, topology data 124 may represent or include dynamic topology data that changes based on underlying needs.

For example, in the context of executing business transactions (e.g., seasonal increase in sales or increase in insurance claims after a weather catastrophe), there may be a spike in demand for related network resources. In response, additional resources may be allocated dynamically to accommodate the demand, and then re-allocated when the demand is reduced. In other examples, new resources may be deployed as new services are offered. Various topology discovery tools may be used to discover a current network topology and related information, including use of information collected by one or more of the monitors 112, 114, or the monitor aggregator 116. More detailed examples of network topologies are provided below, or would be apparent to one of skill in the art.

In example topology approaches, a multi-layer approach may be used. For example, a topmost layer may contain connections between software components, such as calling relationships between front-end servers and back-end servers. Middle layer(s) may contain infrastructure topology data between different virtualized and physical infrastructures, such as relationships between containers and virtual machines. Lower layer(s) may contain network infrastructure information, such as relationships between networking components such as switches and routers.

A knowledge graph 126 represents another source of data for use by the IT landscape manager 102. For example, the knowledge graph 126 may be used to capture domain knowledge that is entity-specific, user-specific, or deployment-specific. The knowledge graph 126 may include user knowledge captured declaratively in graph form over time and/or in response to changes being made to the systems 104, 108.

For example, two entities may deploy networks with very similar topologies, but which differ based on underlying use-case scenarios. Such use-case scenarios may dictate, for example, a response of an application or service. Therefore, the knowledge graph 126 may include, for example, various domain heuristics, ontological inferences, legacy configuration data, and various other types of domain knowledge.

For example, the knowledge graph 126 may include known relationships across monitored entities and may use a graph-based data model to represent domain knowledge. A framework of monitored entities may enable capture of data from experts, either manually or by machine learning to create the knowledge graph 126. The knowledge graph 126 may be constructed as a directed labeled graph.

In some scenarios, there may be overlapping data or types of data stored in the topology data 124 and the knowledge graph 126. Additionally, there may be other types of network data available with respect to the systems 104, 108, or any aspect of the IT landscape 103 monitored by the IT landscape manager 102.

As referenced above, and described in detail, below, the IT landscape manager 102 may be configured to use the events repository 122, the topology data 124, the knowledge graph 126, and any other available sources of network data, to ensure smooth, continuous operation of the IT landscape 103 being monitored. For example, the IT landscape manager 102 may be configured to determine causal connections between event pairs to construct causal event clusters, which identify situations occurring within the IT landscape. Further, the IT landscape manager 102 may be configured to use the identified situations to determine root cause events thereof, to predict potential occurrences of similar situations in the future, and to automatically remediate actual or potential situations.

In more detail, the IT landscape manager 102 may include a situation identifier 128, which may be configured to analyze sets of events from the event collector 120 and/or the events repository 122 to determine one or more situations that have occurred, or are occurring, within the IT landscape 103. As referenced above, the situation may refer to a group or cluster of individual events that are determined to be causally related to one another and that have some combined impact within the IT landscape 103.

For example, the situation may include a large-scale situation such as a system-wide crash. In other examples, the situation may include a smaller scale situation such as a component freeze. In general, the situation may be considered to include one or more events that require attention, repair, or remediation, or that have some other consequence for users of the IT landscape 103.

That is, as referenced above, some individual events may be transient or harmless when occurring in isolation. Some detected events may raise a false alarm and may not require any attention or action on the part of an administrator or user. Some detected events may have an impact that does not rise to the level of requiring action in response, such as when a response time of the component 110 is slowed, but a response time of the system 108 as a whole remains within acceptable levels.

The situation, on the other hand, as used herein, generally requires some response. The situation may reflect an aggregate impact of multiple events. In some cases, however, the situation could be caused by, or include a single event. In many cases, multiple situations may occur within a single time period, or across overlapping time periods. Consequently, when multiple situations occur within single or overlapping time period(s), and each situation includes multiple events, it may be difficult to determine which events should be included within each situation.

In more specific examples, the events repository 122 may include a large number of individual events. For example, the situation identifier 128 may analyze a set of 50 events from the events repository 122. In this particular example, the 50 events may be selected as occurring during a time period that includes a system crash of the system 104 and a component freeze of the component 110.

The situation identifier 128 may be configured to determine a group or cluster of 10 events from the set of 50 events that led up to, and caused, the system crash of the system 104, and a separate group or cluster of 15 events that led up to, and caused, the component freeze of the component 110. A remaining 25 events of the 50 events may be determined to be causally unrelated to the two situations being examined.

Moreover, as referenced above and described in detail, below, the situation identifier 128 may be configured to characterize the 10 events causing the system crash as a first directed labeled graph and the 15 events causing the component freeze as a second directed labeled graph. For example, each event in the 10 events causing the system crash of the system 104 may have either a parent or a child event, or both.

In conventional approaches to clustering events, event clusters include potentially correlated events, without establishing a causal direction between individual pairs of events. Consequently, it is difficult in conventional approaches to determine whether an individual event is either a cause of or an effect of another event or is merely correlated with another event.

In contrast, the situation identifier 128 provides directed clusters of events that define corresponding situations. Consequently, a root cause inspector 130 may be configured to identify, within each directed cluster of events, one or more specific events that should be a focus for correcting the situation, or for avoiding the situation in the future.

For example, in the examples above, the 10 events leading to the system crash of the system 104 may each include corresponding system violations, such as excessive memory usage. However, the excess memory usage may be caused by an underlying application that is malfunctioning, which also may be causing other events (e.g., excessive processor usage).

The root cause inspector 130 may thus be configured to identify an event of a directed cluster of events as a root cause event. In many scenarios, however, identifying a root cause node may be more complex than simply picking an earliest event node within the directed cluster of event nodes.

Thus, the situation identifier 128 and the root cause inspector 130 may be configured to identify a situation and its root cause. Consequently, the administrator or user may be provided with an ability to resolve a situation quickly, efficiently, and reliably.

Moreover, a prediction manager 132 may be configured to utilize captured situation information, root cause information, and resolution information of multiple situations that occur over time, to thereby predict similar situations prior to such predicted situation actually occurring. For example, machine learning algorithms may be trained using the actual situation, root cause, and/or resolution data, so that the trained algorithms may then predict similar situation(s) occurring in the future.

A remediation generator 134 may be configured to determine and execute remediation techniques to address and resolve situations in an automated manner. That is, instead of, or in addition to, the administrator or user taking action to resolve actual situations, or avoid predicted situations, the remediation generator 134 may be configured to do so with little or no human interaction or moderation. For example, the remediation generator 134 may store, or have access to, pre-generated remediation scripts, which may be matched to corresponding situations identified by the situation identifier 128.

The situation identifier 128 may further include an event handler 136. The event handler 136 may be configured to identify events from the events repository 122 to be further processed by the situation identifier 128.

In the simplified example of FIG. 1B, the event handler 136 is shown as determining an event set 137 that includes a number of events. For example, the event set 137 may represent a static set of events. For example, the event set 137 may be captured as occurring within a specified time window prior to some recognized situation(s) to be examined. In other examples, the event set 137 may be captured as being related to a particular network(s), geographical location(s), and/or any other factors that may be relevant to diagnosing situation(s) that have occurred.

In other examples, the event set 137 may represent a dynamic event set. For example, new events determined by the event collector 120 and stored within the events repository 122 may be added to the event set 137 upon arrival in the event handler 136 if determined to be potentially relevant to the situation analysis being performed.

An event pair selector 138 may be configured to analyze selected pairs of events from the event set 137. For example, in some examples, the event pair selector 138 may be configured to analyze each pair-wise combination of all of the events of the event set 137.

In many scenarios, however, it may be undesirable, infeasible, or inefficient to select all possible pairs of events within the event set 137. For example, the event set 137 may include too many events to perform a complete pair-wise analysis of all included events in an effective or efficient manner.

In other examples, some event pairs may be more valuable than others for purposes of identification and processing by the situation identifier 128. Moreover, as referenced above, the event set 137 may dynamically change over time, and the event pair selector 138 may benefit from being configured to incrementally add new events to the event set 137. In any of the above examples, and in other scenarios, the event pair selector 138 may be configured to filter some events from the event set 137 prior to, or in conjunction with, selecting event pairs for further processing. For example, the event pair selector 138 may be configured to identify and filter low-entropy events.

For each event pair determined by the event pair selector 138, an edge generator 140 may be configured to determine a causal probability that indicates both a direction and a score associated with an intervening edge. As referenced above, and described in detail, below, the edge generator 140 may calculate and quantify a probability that one event of an event pair being analyzed caused (or was caused by) the other event of the event pair.

For example, for an event pair of event_1 and event_2, a causal probability may be determined as to whether event_1 caused event_2, or vice versa. In the following description, calculated probabilities are normalized between [0, 1]. However, many different representations of the calculated probabilities may be used.

Thus, the calculated probability may be used to indicate a direction between the two events, and the magnitude of the calculated probability may be used to indicate a strength of the causal connection. In some cases, an event pair may not have a causal connection, or the calculated causal probability may be indeterminate or otherwise unusable. In these cases, one or both of the events of such event pairs may be omitted from further analysis by the edge generator 140.

The edge generator 140 may be configured to determine and characterize causal pairs of events (which may be referred to as causal event pairs) using one or more of a plurality of techniques and data sources. For example, the event pair selector 138 may be configured to consider all candidate edges between candidate pairs and remove uncorrelated edges therefrom. Then, the edge generator 140 may be configured to apply one or more types of orientation rules and available, relevant data, in order to determine a direction and causal strength of each remaining edge.

For purposes of explaining FIG. 1B, it may be appreciated that the edge generator 140 may utilize various types of data referred to herein as 'priors,' to indicate types of information determined prior to the edge calculations being performed. For example, topological priors may be determined from the topology data 124. For example, as described above, the topology data 124 may reflect and describe connections between and among the various systems and components of the IT landscape 103. Therefore, knowledge of such connections may be leveraged to determine a probability as to whether and to what extent events at two connected components were likely to have been causally related.

Similarly, the knowledge graph 126 may include custom knowledge priors collected over time from administrators or users such as customers. For example, such knowledge may be obtained in the form of customer feedback, such as may occur after previously resolved situations. Knowledge needed to make accurate edge characterizations for causal event pairs may be obtained directly through the use of generated questionnaires provided to administrators or users to collect needed information.

In other examples, historical or real-time priors may be used, which refer to past or concurrent IT landscape data collected in various contexts and formats. For example, the metrics 118 may be analyzed during normal operations of the IT landscape to collect and aggregate information characterizing historical or current operations of the IT landscape 103 that may be relevant. In other examples, some types of historical and/or real-time priors may be collected in the context of the events repository 122.

The edge generator 140 may use any one or more of the above-referenced types of priors, or other types of priors, to calculate desired edges for causal event pairs, including both a direction and a causality strength for each causal event pair. The causality strength may be understood to characterize, for example, a level of certainty with which one event of a causal event pair may be said to cause the other event of the causal event pair. The causality strength may also be understood to represent a degree of similarity of the two events of a causal event pair, in the sense that the two events similarly appear within a single situation or type of situation.

As mentioned above, the causal strength may be expressed as a normalized value between [0, 1]. For example, a causal strength may be expressed as 0.8. In some implementations below, two events of a causal event pair may be said to be related to one another by a distance, which may also be referred to as a topological distance, that is defined as an inverse of the causal strength, e.g., as (1—causal strength). For the example just given with a causal strength of 0.8, the same causal event pair may be said to be separated by a distance of (1–0.8)=0.2.

Once causal event pairs and intervening edges have been determined, an arborescence graph generator 142 may be configured to transform the event pairs and edges into an arborescence graph. An arborescence graph is a directed graph in which, for a vertex u called the root and any other vertex v, there is exactly one directed path from u to v. An arborescence may also be understood as the directed labeled-graph form of a rooted tree structure.

The arborescence graph generator 142 may be capable of generating many different instances of arborescence graphs from the causal event pairs and intervening edges provided by the edge generator 140, because, for example, there may be many different paths to follow within the causal event pairs and intervening edges. In FIG. 1, the arborescence graph generator 142 may be configured to generate and provide the instance of the potential minimum arborescence graphs in which, for each directed path from u to v, the summed edge scores of the included edges within that directed path are the least number of edge scores. Such an arborescence graph may be referred to as a minimum arborescence graph.

A cluster tree generator 144 may then be configured to convert the arborescence graph into a cluster tree 144a. The cluster tree 144a may refer to a modification or enhancement of the arborescence graph in which potential or candidate event clusters 144b, 144c, 144d, 144e are identified and characterized for further evaluation.

For example, the cluster tree generator 144 may be configured to generate the cluster tree 144a with each candidate event cluster 144b, 144c, 144d, 144e therein having a corresponding causal score. For example, two (or more) causal event pairs (that is, four or more total events) within the arborescence graph that have the same causal score may be grouped within a single candidate event cluster having that same causal score as its cluster score. Thus, individual candidate event clusters may be identified by their respective cluster scores and by their respective placements within the hierarchy of the cluster tree 144a. For example, two candidate event clusters (e.g., 144c and 144e) may have the same cluster score but may be differentiated by their respective placements within the cluster tree 144a.

Thus, the candidate event clusters 144*b*, 144*c*, 144*d*, 144*e* may be arranged hierarchically within the cluster tree 144*a*, based on the arborescence graph determined by the arborescence graph generator 142. Thus, each candidate event cluster 144*b*, 144*c*, 144*d*, 144*e* may have a parent and/or child candidate event cluster. For example, the candidate event cluster 144*c* is a parent of the candidate event cluster 144*d*, and the candidate event cluster 144*b* is a parent of the candidate event clusters 144*c* and 144*e*.

Then, a cluster selector 146 may be configured to analyze the cluster tree 144*a*, using the cluster scores of the candidate event clusters and the layout of the cluster tree 144*a*, to identify and select specific event clusters from the candidate event clusters 144*b*, 144*c*, 144*d*, 144*e*, which are shown in FIG. 1B as event graphs 146*a*, 146*b*, which also may be referred to as, e.g., clusters, event clusters, situations, or situation event graphs. For example, selecting the largest candidate event graph 144*b* may not helpful, because the candidate event graph 144*b* may be too inclusive and may not define a situation that is sufficiently isolated for further analysis by the root cause inspector 130 to be helpful. On the other hand, the candidate event cluster 144*d* may be too small to provide useful insights, e.g., may be part of a larger situation that may not be recognizable from just the candidate event cluster 144*d*.

The cluster selector 146 thus performs an optimization in which event clusters are defined and selected at levels that are representative of situations large enough to be meaningfully analyzed, without being so large as to be over-inclusive. For example, as described in detail, below, the cluster selector 146 may use differences between cluster scores of parent candidate event clusters and child candidate event clusters to determine an effective merger limit of a candidate event cluster, at which point that candidate event cluster would be merged with another candidate event cluster.

As referenced above, in conventional clustering solutions using correlated events without causal connections being available, selecting cluster identifications as causal require manual selection and tuning based on, e.g., underlying characteristics of the IT landscape 103, or of the included events. In FIG. 1B, however, the arborescence graph of the arborescence graph generator and the cluster tree 144*a* provide causal connections between events, and the cluster selector 146 may automatically determine optimum clustering parameters in a dynamic fashion over time, without requiring manual tuning.

Consequently, as referenced above, the event graphs 146*a*, 146*b* may represent specific problems or other situations to be resolved within the IT landscape 103. Thus, the root cause inspector 130 may be configured to determine a root cause event of each of the event graphs 146*a*, 146*b*, and, in some examples, the remediation generator 134 may be configured to automatically generate and execute remediation plans.

For example, in simplified examples, the event graph 146*a* may be related to a low disk-space error caused by a root node of the event graph 146*a*. Remediation efforts may include cleaning up the disk in question and/or adding more disk space. For example, the event graph 146*b* may be related to a database query response time degradation error caused by a root node of the event graph 146*b*. Remediation efforts may include cleaning up relevant queues and restarting the database in question.

In the example of FIG. 1B, the IT landscape manager 102 is illustrated as being provided using at least one computing device 148, which includes at least one processor 150 and a non-transitory computer-readable storage medium 152.

Thus, the at least one computing device 148 may represent multiple computers, a mainframe(s), a server(s), a virtual machine(s), or other computing devices connected by a suitable network, any one of which may include multiple processors represented by the at least one processor 150, as well as multiple types of memories represented by the non-transitory computer-readable storage medium 152. For example, instructions may be stored on the non-transitory computer-readable storage medium 152 for execution by the at least one processor 150.

Accordingly, any of the event collector 120, events repository 122, topology data 124, and/or knowledge graph 126 may be executed or stored using a plurality of networked computers and need not be provided using the same computer(s) as used to provide the IT landscape manager 102. In some implementations, the monitors 112, 114 or the monitor aggregator 116 may be executed using the at least one computing device 148. In some implementations, any of the event collector 120, events repository 122, topology data 124, and/or knowledge graph 126 may be incorporated into the IT landscape manager 102. Many other implementations are possible.

The simplified example of FIG. 1B omits many components or aspects of the at least one computing device 148, for the sake of brevity. For example, the at least one computing device 148 may include, or have access to, a suitable display for displaying any of the inputs or outputs of the situation identifier 128, the root cause inspector 130, the prediction manager 132, and/or the remediation generator 134. For example, a suitable graphical user interface (GUI) may be used to display the clusters 146*a*, 146*b*, along with related aspects or details.

FIG. 1C illustrates use of topology data 124, the knowledge graph 126, and event graphs represented by the event graph 146*a* of FIGS. 1A and 1B for auto narrative generation from situation(s) by adaptive training of GPT models with topology. In the present description, the term narrative should be understood to refer to an explanation, discussion, description, or exposition regarding a processed event graph and associated event text. Such a narrative is more inclusive and more accurate than a summary obtained from processing the event text alone. For example, such a narrative may capture and describe information that is implicit within the event graph 146*a*, which may be apparent to a human user, but which may be unnoticed or omitted when processing or summarizing event text of the event graph 146*a* using a conventional LLM. Therefore, for purposes of the present description, the term summary should be understood to refer to a non-limiting example subset of the term narrative.

In FIG. 1C, a narrative generator 100*c* represents an example of the situation analyzer 100 of FIG. 1A. As shown, the example of FIG. 1C illustrates both a training flow and an inference (or runtime) flow for executing the narrative generator 100*c*.

In the example of FIG. 1C, situation narrative feedback 162*c* represents labeled training data as an example of training data 162 of FIG. 1A. A training engine 160*c* similarly represents an example implementation of the training engine 160 of FIG. 1A. A fine-tuned LLM 153*c* illustrates an example of the LLM 153 of FIG. 1A, trained in FIG. 1C for narrative generation.

In more detail, the situation narrative feedback 162*c* includes labelled training data for current or past event graphs, represented in FIG. 1C by event graph 146*a*. For example, for training purposes, the situation narrative feedback 162*c* may include the event graph 146*a*, including a representation capturing the graphical nature of the event graph 146*a*, as referenced above and described in more detail, below, as well as an extraction of textual information. Then, a corresponding narrative may be stored together with the above-referenced graphical and textual information for the event graph 146*a*, within the situation narrative feedback 162*c*.

For example, a narrative to be used as a label for purposes of performing supervised training with the training engine 160*c* may be provided by a human user who reviews the event graph 146*a*. In other examples, a narrative that was previously generated by the fine-tuned LLM 153*c* may be modified by a human user, and the modified narrative may be stored with its corresponding event graph within the situation narrative feedback 162*c*.

The training engine 160*c* may perform training of the fine-tuned LLM 153*c*, using the situation narrative feedback 162*c* with corresponding event graphs represented by the event graph 146*a*, the topology data 124, and the knowledge graph 126. In this way, the training engine 160*c* may perform supervised training within the context of the topology data 124, the knowledge graph 126, the situation event graph(s) 146*a*, and the situation narrative feedback 162*c*.

Once training is complete, the fine-tuned LLM 153*c* may be deployed. For example, during active inference operations, the fine-tuned LLM 153*c* may receive a current event graph, represented by the event graph 146*a*, along with relevant topology data from the topology data 124 and/or knowledge data from the knowledge graph 126. In other words, the fine-tuned LLM 153*c* processes an event graph 146*a* in much the same manner during inference as during training, but without a corresponding ground truth narrative and without making any adjustments to tuning parameters of the fine-tuned LLM 153*c*.

In FIG. 1C, the fine-tuned LLM 153*c* is illustrated as including topology adapters representing examples of the topological context adapter(s) 154 of FIG. 1A. For example, although not separately illustrated in FIG. 1C, each such topology adapter may include a graph adapter that is configured to input and process one or more of the situation event graph(s) 146*a*, relevant portions of the topology data 124, and/or relevant portions of the knowledge graph 126. Each such topology adapter may further include a text adapter configured to process extracted event text obtained from the situation event graph 146*a* (e.g., corresponding to the event text 146*c* of FIG. 1A). Outputs of each graph adapter/text adapter pair may then be combined for further processing by subsequent stages of the fine-tuned LLM 153*c*. More detailed examples of such graph adapters and text adapters are described below in detail, e.g., with respect to FIG. 8.

FIG. 1D is similar to FIG. 1C, but illustrates generation of an actionable remediation for the situation event graph(s) 146*a*. In FIG. 1D, a remediation generator 100*d* represents an example of the situation analyzer 100 of FIG. 1A. As shown, the example of FIG. 1D illustrates both a training flow and an inference (or runtime) flow for executing the remediation generator 100*d*.

In the example of FIG. 1D, incident data 162*d* represents labeled training data as an example of training data 162 of FIG. 1A. The incident data 162*d* refers to any relevant data from incident tickets and/or associated worklogs, which may be related to situations in the context of the topology data 124 and the knowledge graph 126. As shown in FIG. 1D, the incident data 162*d* may be obtained from various IT ticket/service management and/or IT defect/task management products 165, in conjunction with processing situation event graphs represented by the event graph 146*a*.

A training engine 160*d* represents an example implementation of the training engine 160 of FIG. 1A. A fine-tuned LLM 153*d* illustrates an example of the LLM 153 of FIG. 1, trained in FIG. 1D for remediation generation.

In more detail, the incident data 162*d* includes labeled training data for current or past incidents. For example, for training purposes, the incident data 162*d* may include incident ticket and/or worklog data associated with resolved incidents for corresponding event graphs represented by the event graph 146*a*. As in FIGS. 1A and 1C, the incident data 162*d* may include a representation capturing the graphical nature of the event graph 146*a*, as well as an extraction of textual information from the event graph 146*a* and the incident ticket and/or worklog data from resolved incidents. Then, a corresponding remediation may be stored together with the above-referenced graphical and textual information for the event graph 146*a* and associated incident, within the incident data 162*d*.

For example, a remediation to be used as a label for purposes of performing supervised training with the training engine 160*d* may be provided by a human user who reviews relevant incident data. In other examples, a remediation that was previously generated by the fine-tuned LLM 153*d* may be modified by a human user, and the modified remediation may be stored with its corresponding incident within the incident data 162*d*.

For example, a human user may assign a grade to a previously determined remediation. For example, high grades may be assigned to remediations that provide clear, actionable steps that are likely to resolve a related incident. Low grades may be assigned to remediations that are high-level, abstract, or general, without providing specific actionable steps to be taken to achieve resolution.

The training engine 160*d* may perform training of the fine-tuned LLM 153*d*, using the incident data 162*d*. In this way, the training engine 160*d* may perform supervised training within the context of the topology data 124, the knowledge graph 126, the situation event graph(s) 146*a*, and the incident data 162*d*.

Once training is complete, the fine-tuned LLM 153*d* may be deployed. For example, during active inference operations, the fine-tuned LLM 153*d* may receive a current event graph, represented by the event graph 146*a*, along with relevant topology data from the topology data 124 and/or knowledge data from the knowledge graph 126. In other words, the fine-tuned LLM 153*d* processes an event graph 146*a* for remediation in much the same manner during inference as during training, but without a corresponding ground truth remediation and without making any adjustments to tuning parameters of the fine-tuned LLM 153*d*.

In FIG. 1D, the fine-tuned LLM 153*d* is illustrated as including topology adapters representing examples of the topological context adapter(s) 154 of FIG. 1A. For example, although not separately illustrated in FIG. 1D, each the topology adapter may include a graph adapter that is configured to input and process one or more of the situation event graph 146*a*, relevant portions of the topology data 124, and/or relevant portions of the knowledge graph 126. Each such topology adapter may further include a text adapter configured to process extracted event text obtained from the situation event graph 146*a* (e.g., corresponding to the event text 146*c* of FIG. 1A). Outputs of each graph adapter/text adapter pair may then be combined for further processing by subsequent stages of the fine-tuned LLM 153*d*. More detailed examples of such graph adapters and text adapters are described below in detail, e.g., with respect to FIG. 8.

FIG. 2A is a flowchart illustrating example operations of the narrative generation of FIG. 1C, and FIG. 2B is a flowchart illustrating example operations of the remediation generation of FIG. 1D. In the example of FIGS. 2A and 2B, operations are illustrated as separate, sequential operations. In various implementations, the illustrated operations may include sub-operations, may be performed in a different order, may include alternative or additional operations, or may omit one or more operations. Further, in all such implementations, included operations may be performed in an iterative, looped, nested, or branched fashion.

In FIG. 2A, an event graph representing a causal chain of events representing a situation within a network may be determined, the event graph including event text characterizing at least one event of the causal chain of events (202a). For example, the situation event graph 146a may be received as including an identified root cause node and subsequent event nodes. A failure or other consequence or result of the situation may be identified. Event text may be extracted from the situation event graph 146a. The situation event graph 146a may be transformed into a textual graph representation that, e.g., identifies each node (including a root cause node), captures causal relationships between nodes, and characterizes a strength and/or nature between each pair of nodes in the graph. Accordingly, the extracted event text and the textual graph representation may be included in an LLM prompt, e.g., for the fine-tuned LLM 153c.

The event graph may be processed using a large language model that includes at least one topological context adapter that includes a graph adapter and a text adapter, including processing the event graph with the graph adapter and the event text with the text adapter (204a). For example, the fine-tuned LLM 153c may receive the event text and the textual graph representation from the LLM prompt. A graph adapter of the fine-tuned LLM 153c may execute one or more graph embeddings of the situation event graph 146a as included in the textual graph representation, in order to obtain a vector representation of the situation event graph 146a. Similarly, a text adapter of the fine-tuned LLM 153c may process the event text in a vector space. As described in detail, below, weights of the LLM 153c outside of each topological adapter may be frozen during training, while weights of each topological adapter (including each included graph adapter and text adapter) are updated as training progresses, resulting in fine-tuning of the fine-tuned LLM 153c to the context of situation narrative generation.

Outputs of the graph adapter and the text adapter may be combined to generate, from the large language model, a narrative of the situation that explains the causal chain of events (206a). For example, outputs of the graph adapter and the text adapter, obtained using the weights previously determined during training as just referenced, may be combined in a feed-forward layer and passed to a subsequent stage of the LLM 153c. As different, multiple topology adapters (each with an included graph adapter and text adapter) may be included within the fine-tuned LLM 153c, the various topology adapters may each be trained to recognize and process different aspects of the input situation event graph 146a, so that a full and complete narrative may be generated.

In the example of FIG. 2B, an event graph representing a causal chain of events representing a situation within a network may be determined, the event graph including event text characterizing at least one event of the causal chain of events (202b). For example, the situation event graph 146a may be received as including an identified root cause node and subsequent event nodes. As in FIG. 2A, a failure or other consequence or result of the situation may be identified. Event text may be extracted from the situation event graph 146a. The situation event graph 146a may be transformed into a textual graph representation that, e.g., identifies each node (including a root cause node), captures causal relationships between nodes, and characterizes a strength and/or nature between each pair of nodes in the graph. Accordingly, the extracted event text and the textual graph representation may be included in an LLM prompt, e.g., for the fine-tuned LLM 153c.

The event graph may be processed using a large language model that includes at least one topological context adapter that includes a graph adapter and a text adapter, including processing the event graph with the graph adapter and the event text with the text adapter, wherein the at least one topological context adapter is trained using worklog data describing past situations and corresponding actions taken to remedy the past situations (204b). For example, the fine-tuned LLM 153d may receive the event text and the textual graph representation from the LLM prompt. A graph adapter of the fine-tuned LLM 153d may execute one or more graph embeddings of the situation event graph 146a as included in the textual graph representation in order to obtain a vector representation of the situation event graph 146a. Similarly, a text adapter of the fine-tuned LLM 153d may process the event text in a vector space. As described in detail, below, weights of the LLM 153d outside of each topological adapter may be frozen during training, while weights of each topological adapter (including each included graph adapter and text adapter) are updated as training progresses, resulting in fine-tuning of the fine-tuned LLM 153d to the context of situation narrative generation. Specifically, as referenced, the training may be performed using corresponding, high-quality worklog data from previously resolved incidents.

Outputs of the graph adapter and the text adapter may be combined to generate, from the large language model, instructions to remedy the situation (206b). For example, outputs of the graph adapter and the text adapter, obtained using the weights previously determined during training as just referenced, may be combined in a feed-forward layer and passed to a subsequent stage of the LLM 153d. As different, multiple topology adapters (each with an included graph adapter and text adapter) may be included within the fine-tuned LLM 153d, the various topology adapters may each be trained to recognize and process different aspects of the input situation event graph 146a, so that a highly actionable remediation may be generated.

Figure 3:
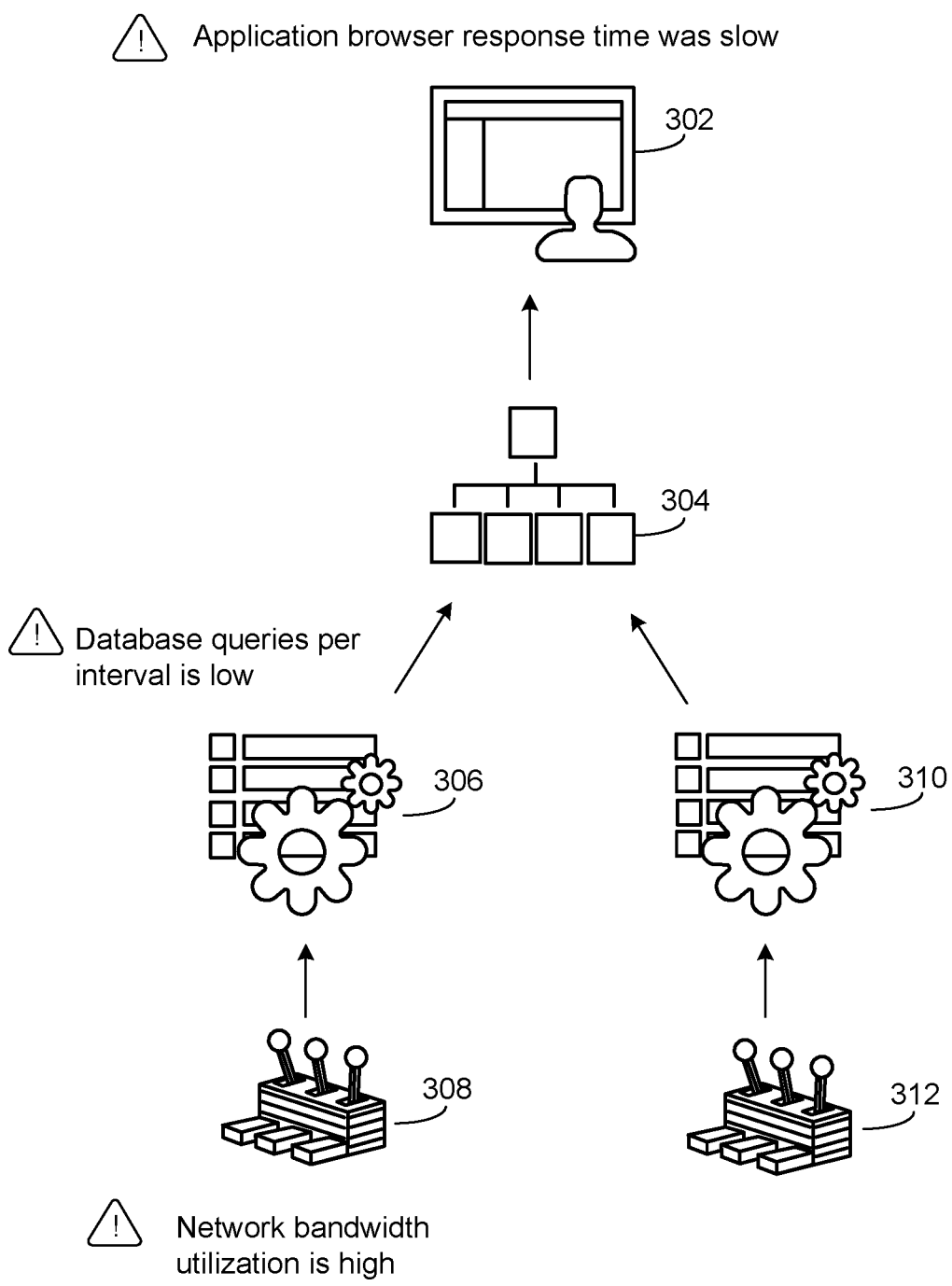
FIG. 3 illustrates a first example contextual situation event graph.

FIG. 3 illustrates a first example contextual situation event graph. In the example of FIG. 3, an event 302 involves an application browser with a slow response time. A preceding event 304 involves a load balancer balancing database queries across multiple databases, including an event 306 related to low quantities of database queries in a given interval, which is caused by an event 308 related to high network bandwidth utilization. Meanwhile, a non-anomalous event 310 relates to database queries being within an expected range, corresponding to a non-anomalous event 312 in which network bandwidth utilization is within an expected range.

Meanwhile, FIG. 4 illustrates a second example contextual situation event graph. In FIG. 4, similar to FIG. 3, an event 402 involves an application browser with a slow response time. A preceding event 404 involves low quantities of database queries in a given interval (without an intervening load balancer as in FIG. 3), which is caused by an event 406 related to high network bandwidth utilization.

Thus, in both FIGS. 3 and 4, in different network contexts (e.g., with and without a load balancer and associated redundancies), a database may have slow response times, which may be caused by a slow disk used to implement the database. The disk may be network-connected and may be slowed by, for example, a misconfiguration of a router connected to the disk.

A conventional approach to summarizing the event graphs of FIGS. 3 and 4, e.g., using a conventional LLM, may thus result in a similar summary for both situations. For example, such a summary might include, "high network utilization caused an increase in response time."

Using the approach of FIGS. 1C and 2A, however, a more accurate and more complete narrative may be generated for each of the situations of FIGS. 3 and 4. For example, the system of FIG. 1C may determine that a high network utilization caused an increase in response time, but because the service had high availability due to the availability of load balancing and redundant bandwidth resources, the resulting risk may not rise to a level of risk of failure. Meanwhile, in FIG. 4, the implementation of FIG. 1C may determine that a high network utilization caused an increase in response time, but because the service had no high availability, the resulting risk may rise to a level of risk of failure.

As may be observed in FIG. 3, the high availability of FIG. 3 is illustrated in the event graph of FIG. 3 by the parallel availability of events 306/308 and events 310/312, together with a load balancer 304, while as may be observed in FIG. 4, the lack of such high availability of FIG. 4 is illustrated in that example by the lack of a parallel branch for the events 404/406 and the corresponding lack of a load balancer. That is, a relevant and proximate topology provides additional information characterizing the situation (e.g., the non-anomalous events 310, 312 of FIG. 3, which are not present in FIG. 4), which might be recognized by an expert human user but might be unknown or unrecognized by conventional LLMs and similar methods. That is, as noted in the above examples, conventional LLMs have no way to process event graphs in conjunction with event text as described herein, and are thus unable to make such distinctions or identify such problems.

Similarly, in the context of remediation as described with respect to FIGS. 1D and 2B, a conventional LLM might generate a high-level remediation suggestion such as "monitor and gather data; identify the source of high network utilization; review network architecture; and optimize network traffic." The implementation of FIG. 1D, however, may determine that a suitable remedy might include increasing a replica count and restarting the relevant service. More specifically, with respect to FIG. 4, the implementation of FIG. 1D may determine that the situation may be remedied by increasing interfaces on a relevant switch, allocating additional bandwidth, and escalating to a network operations center (NOC) team.

Figure 5A:
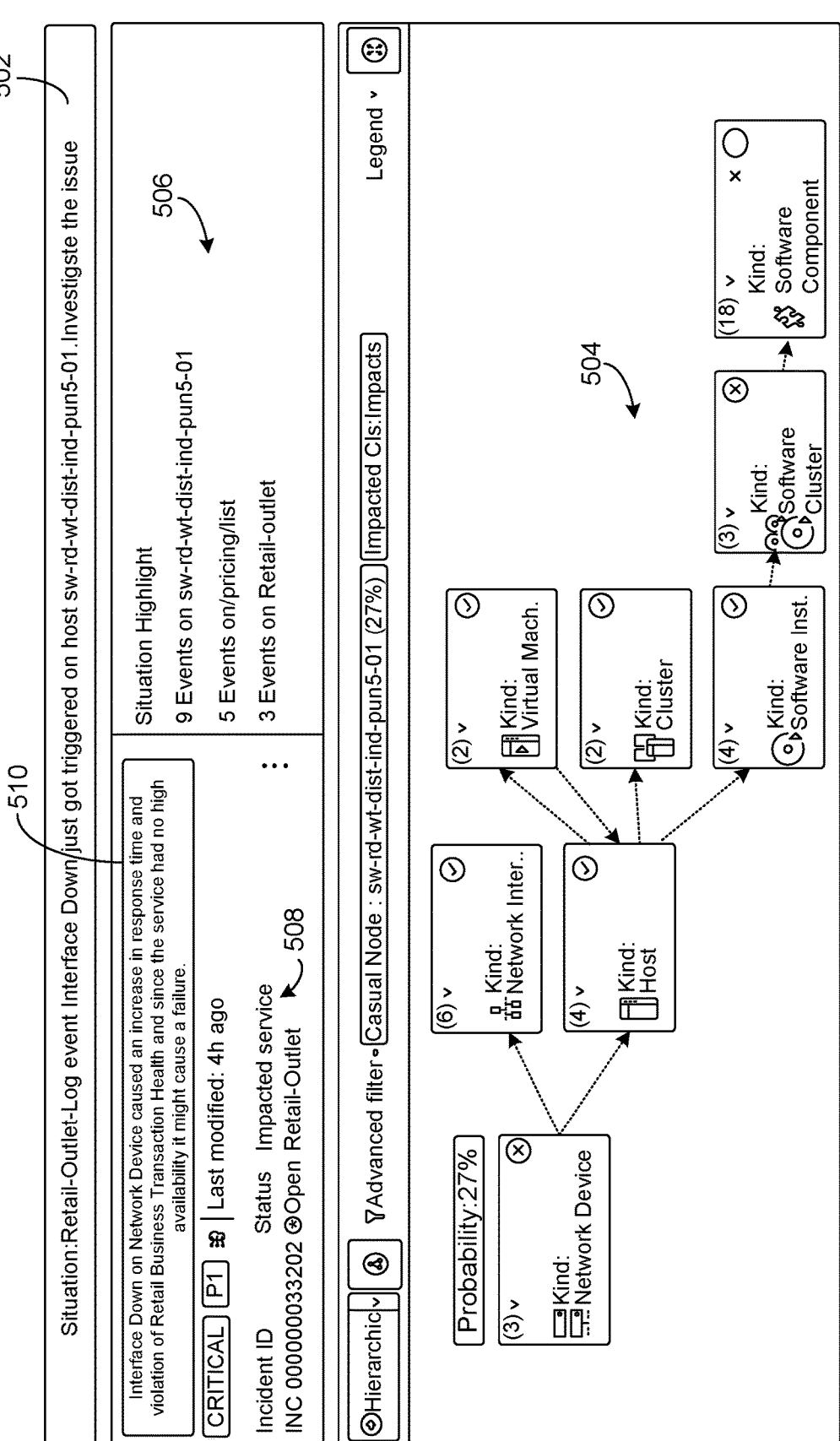
FIG. 5A illustrates an example topology graph with a generated narrative.
Figure 5B:
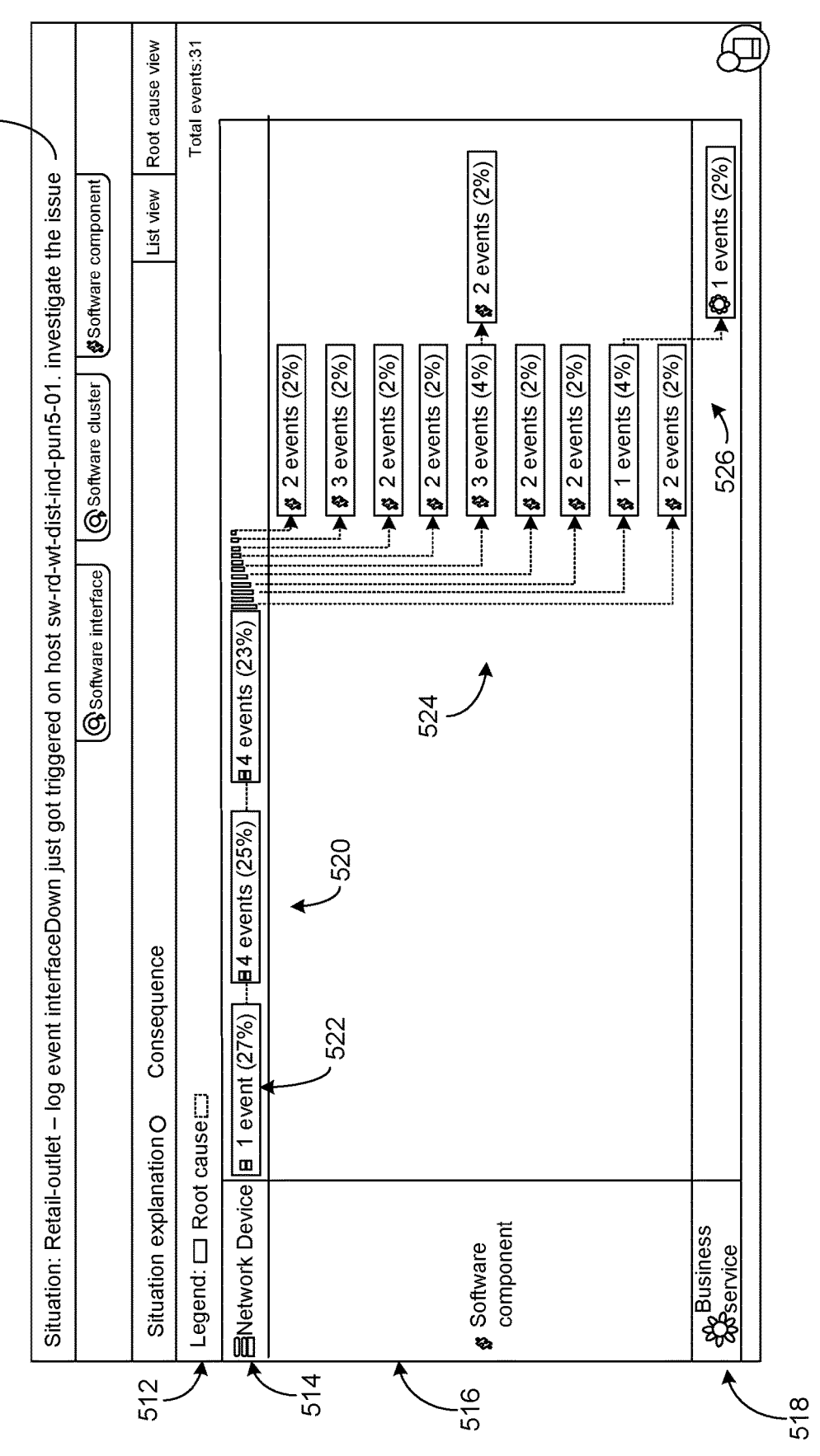
FIG. 5B illustrates an example situation event graph occurring in the context of the example topology graph of FIG. 5A and corresponding to the generated narrative of FIG. 5A.

FIG. 5A illustrates an example topology graph with a generated narrative. FIG. 5B illustrates an example situation event graph occurring in the context of the example topology graph of FIG. 5A and corresponding to the generated narrative of FIG. 5A.

In FIG. 5A, a situation 502 is identified which occurs in the context of a topology graph 504. That is, the topology graph 504 represents a portion of a larger topology graph (e.g., of the topology data 124 of FIGS. 1B, 1C, and 1D). The topology graph 504 includes a plurality of nodes, representing, e.g., various network devices, network interfaces, virtual machines, hosts, and/or software components or clusters that are connected by potential causal relationships represented by edges. In the example, a 27% chance that a root cause event for the situation 502 has been identified, as shown.

Situation highlights 506 represent event groupings by node for further analysis, while situation characteristics 508 illustrate various relevant features, such as situation criticality, a status (e.g., open or closed), an incident identifier (ID), and a most-recent modification. Also, in FIG. 5A, a situation narrative 510 provides an example of the situation narrative 156 of FIG. 1A for the topology graph 504, using the techniques of FIGS. 1C and 2A.

In FIG. 5B, a situation event graph 512 is illustrated to provide a more specific example of the event graph 146a of FIGS. 1A-1D, and corresponding to (e.g., occurring in the context of) the topology graph 504 of FIG. 5A. For example, the situation event graph 512 for the situation 502 may be identified as relating to an interface that is down on a particular host network device and requiring investigation. The situation narrative 510 of FIG. 5A provides the information that an "Interface Down (event) on Network Device caused an increase in response time and violation of Retail Business Transaction Health, and since the service had no high availability it might cause a failure."

FIG. 5B illustrates a network device layer 514, a software component layer 516, and a business service layer 518. For each layer, corresponding individual events (31 total events) occurring in the context of the topology graph 504 are illustrated, each with a corresponding percentage chance of representing a root cause event of the situation 502.

As shown, events 520 are illustrated at the network device layer 514, including an event 522 having a highest (27%) chance of representing a root cause event. Events 524 are illustrated at the software component layer 516, while event 526 is illustrated as occurring at the business service layer 518.

Thus, similar to the example of FIG. 4, the descriptions in FIGS. 5A and 5B provide an example in which the situation narrative 510 explains that a recognized absence of high availability (e.g., load balancing and/or redundancy) may lead to a failure in a retail transaction service. Such a contextual narrative, having an awareness of relevant event/network topology and knowledge graphs, is more detailed, more informative, and more accurate than a simple summary of event text from the various events of the situation event graph 512.

Figure 6:
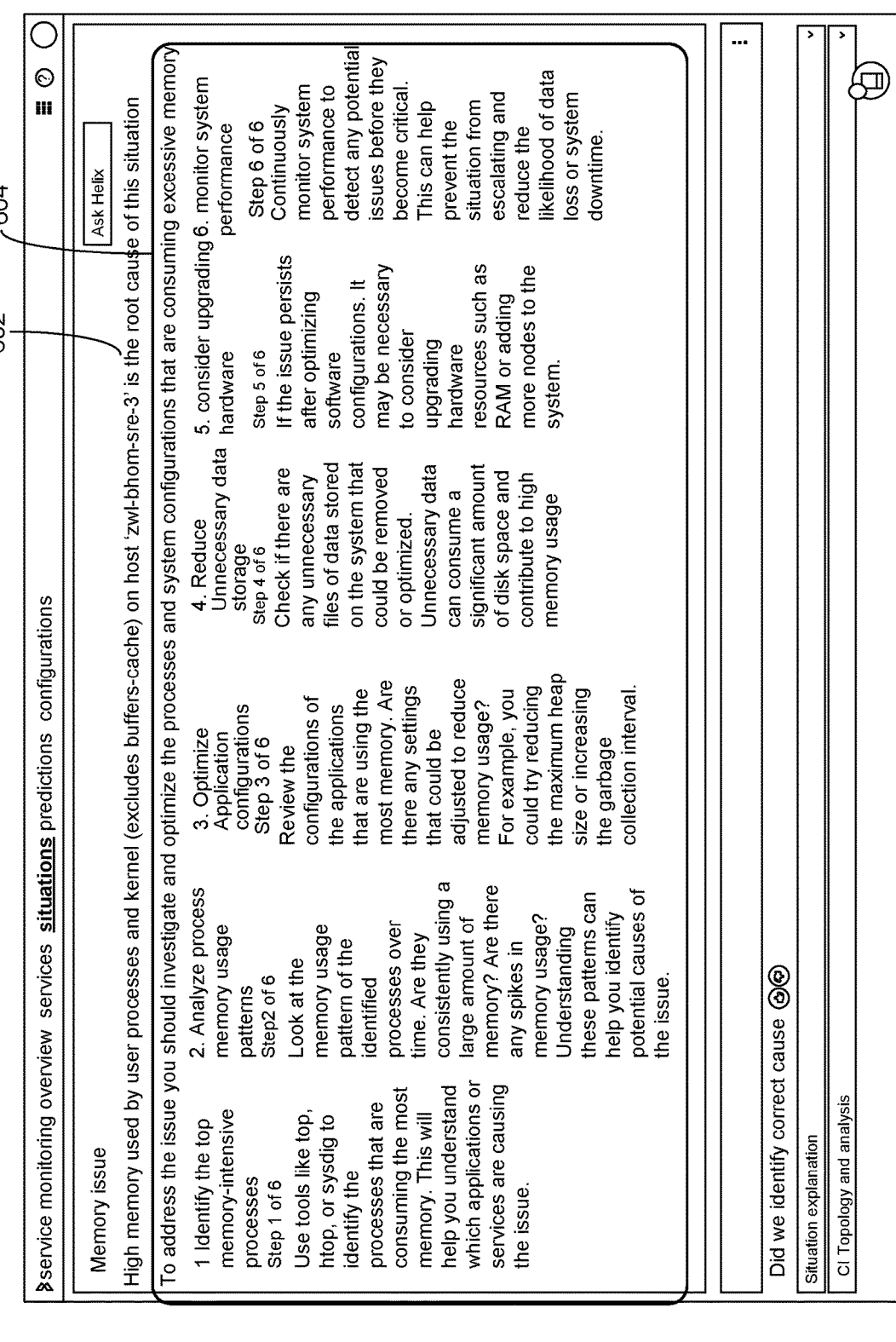
FIG. 6 illustrates an example generated remediation for a situation event graph.

FIG. 6 illustrates an example generated remediation for a situation event graph. In the example of FIG. 6, a situation has been identified related to a memory issue, for which a root cause 602 of "High memory used by user processes and kernel (excludes buffers-cache) on host 'zwl-bhom-sre-3' is the root cause of this situation" has been identified.

FIG. 6 further illustrates a detailed, actional remediation 604 for the identified situation. As shown, the remediation 604 instructs six steps for addressing the situation, including investigating and optimizing processes and system configurations that are consuming excessive memory.

The six steps include first identifying top memory-intensive processes, e.g., using specific tools such as top, htop, or sysdig to identify processes that are consuming the most memory, to help understand which applications or services are causing the issue.

A second step includes analyzing process memory usage patterns, e.g., by looking at the memory usage pattern of the identified processes over time to understand the patterns and thus determine whether they are consistently using a large amount of memory and/or whether there are any spikes in memory usage.

A third step of optimizing application configurations may include reviewing configurations of the applications that are using the most memory to determine whether there are any settings that could be adjusted to reduce memory usage, with examples given of reducing the maximum heap size or increasing the garbage collection interval.

A fourth step of reducing unnecessary data storage includes checking to determine whether there are any unnecessary files of data stored on the system that could be removed or optimized, with a comment provided that unnecessary data can consume a significant amount of disk space and contribute to high memory usage.

A fifth step includes considering the upgrading of hardware. Suggested for consideration, are for example, upgrading RAM or adding more nodes.

A sixth step includes continuously monitoring of system performance to detect any potential issues before they become critical and to help prevent the situation from escalating and thus reduce the likelihood of data loss or system downtime.

Figure 7:
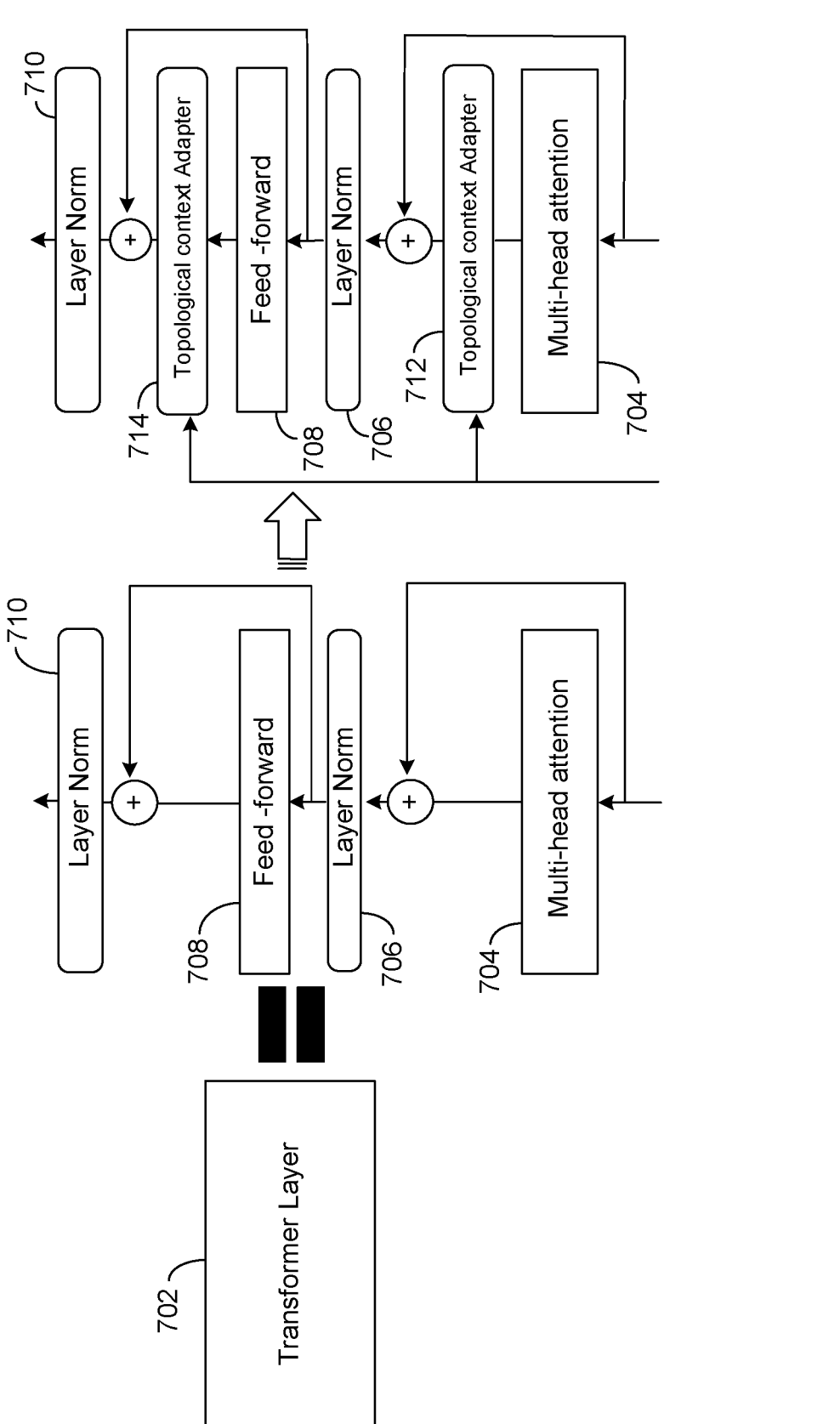
FIG. 7 is a block diagram of an example transformer layer that may be used to implement the system of FIG. 1A.

FIG. 7 is a block diagram of an example transformer layer 702 that may be used to implement the system of FIG. 1A. More specifically, for example, the transformer layer 702 may be included in the LLM 153 of FIG. 1A, such as in the LLM 153c of FIG. 1C or the LLM 153d of FIG. 1D. Other portions of the LLM 153, by themselves, are known and are not described here in further detail, except as needed to understand described techniques.

In general, transformer layer(s) of a LLM, such as the LLM 153 (or 153c, 153d) are designed to convert a type of input into a desired type of output. For example, in the context of language translation, transformer layers may be used to translate English sentences into Spanish sentences or perform any desired translation.

For example, the transformer layer 702, and/or preceding layers of the LLM not explicitly shown in FIG. 7, may be configured to receive textual inputs and provide corresponding embeddings and positional encodings. For example, a received sentence may be assigned an embedding for reach word, as well as a positional encoding for a position of each word within the sentence.

A multi-head attention layer 704 may be configured to determine internal relationships between elements of the input text. For example, the concept of attention in the context of the transformer layer 702 may refer to determinations of relationships between words in a sentence, or among different sentences. Consequently, attention enables disambiguation of words, relationships between pronouns and their corresponding antecedents, entity identification, and general awareness of relative levels of importance of individual words or phrases within the context of the overall input text. In FIG. 7, the term multi-head generally refers to the use of multiple different types of attention mechanisms and associated areas of focus (e.g., shorter-term dependencies or longer-term dependencies) within the input text. In this way, multiple types of attention may be calculated in parallel for improved processing efficiencies.

As further shown in FIG. 7, the inputs of the multi-head attention layer 704 (e.g., word embeddings and positional encodings) may be combined with the outputs of the multi-head attention layer 704, in a process known as a skip connection. Such a skip connection maintains information regarding the input embeddings and/or encodings that might otherwise be lost during the attention calculations, while also facilitating backpropagation operations during training of the transformer layer 702.

The combined inputs and outputs of the multi-head attention layer 704 may then be fed to a normalization layer 706. Such normalization restricts a range of the received, aggregated values, which, e.g., avoids overly large values that can lead to training errors, and generally facilitates determinations of optimal values during back propagation processes, e.g., by keeping available values within a known range. FIG. 7 illustrates an example of layer normalization, in which normalization is applied on a layer-by-layer basis within a neural network being processed, but other types of normalization may be used, as well.

A feed-forward layer 708 refers to a feed-forward network, including an input layer, desired number of hidden layer(s), and an output layer. The feed-forward layer 708 includes edges between the various nodes of the aforementioned layers that are assigned corresponding weights and biases, along with an activation function associated with the nodes. Then, as described above, a residual or skip connection enables a combination of the inputs and outputs of the feed-forward layer 708, followed by another normalization layer 710.

All of the layers 704, 706, 708, 710 may be processed during training operations to assign values to included weights and any other trainable parameter(s), referred to cumulatively herein as weights. As known for LLM transformers such as the transformer layer 702, and as referenced above, such training may be conducted using parallel operations and corresponding parallel processors/processing, to process large amounts of training data. Using such techniques, a conventional transformer may be trained (i.e., weights may be assigned to the various layers 704, 706, 708, 710), to provide useful summaries of received text.

As also referenced above, however, such summaries are available only for received text, and conventional transformers are not capable of processing the event graph 146a or other graph representations of network situations. Therefore, in FIG. 7, a topological context adapter 712, representing an example of the topological context adapter(s) 154 of FIG. 1A, may be added to the illustrated transformer pipeline at a position following the multi-head attention layer 704, while a topological context adapter 714 is also added following the feed-forward layer 708, as shown.

As referenced above, and described in more detail, below, the topological context adapters 712, 714 may be configured to input and process graphs, such as the event graph 146a, together with event text (shown as event text 146c in FIG. 1A). For example, the transformer weights of the layers 704, 706, 708, 710 may be frozen or held at constant values determined from previous training, while adapter weights of the topological context adapters 712, 714 are updated during a subsequent fine-tuning training process that includes training performed with respect to event graphs, topology graphs, and/or knowledge graphs.

Figure 8:
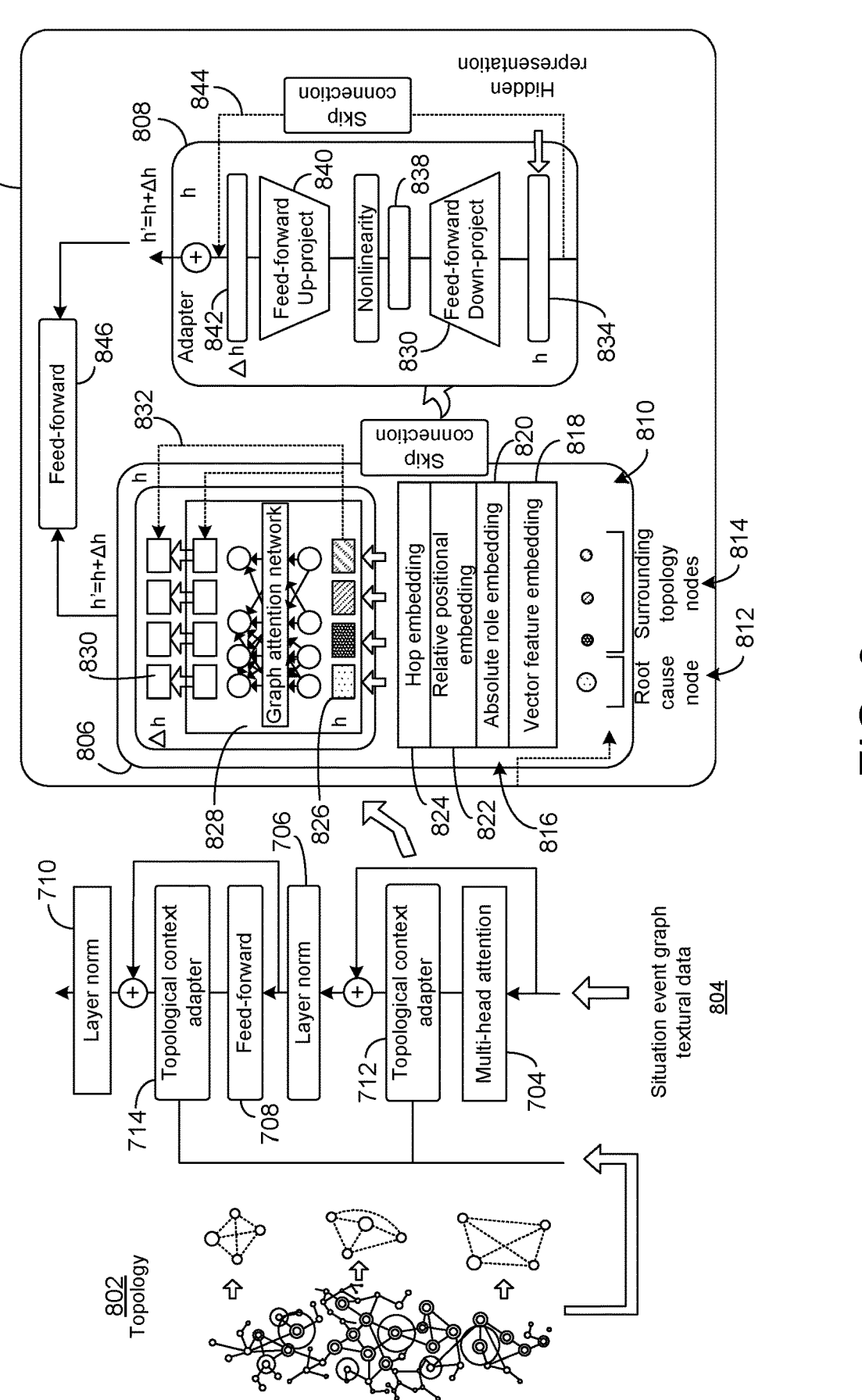
FIG. 8 is an example of a more detailed view of the example transformer layer of FIG. 7.

More specifically, as shown in FIG. 8, graph data 802 may be provided to the topological context adapters 712, 714, while event graph text 804 is provided as input to the multi-head attention layer 704. FIG. 8 further illustrates an exploded view of the topological context adapter 712.

As illustrated in FIG. 8, and as referenced earlier in the examples of FIGS. 2A and 2B, the topological context adapter 712 includes a graph adapter 806 and a text adapter 808. The graph adapter 806 may be trained and otherwise configured to process graph data, as just referenced. Meanwhile, the text adapter 808 represents any suitable network

Figure 9:
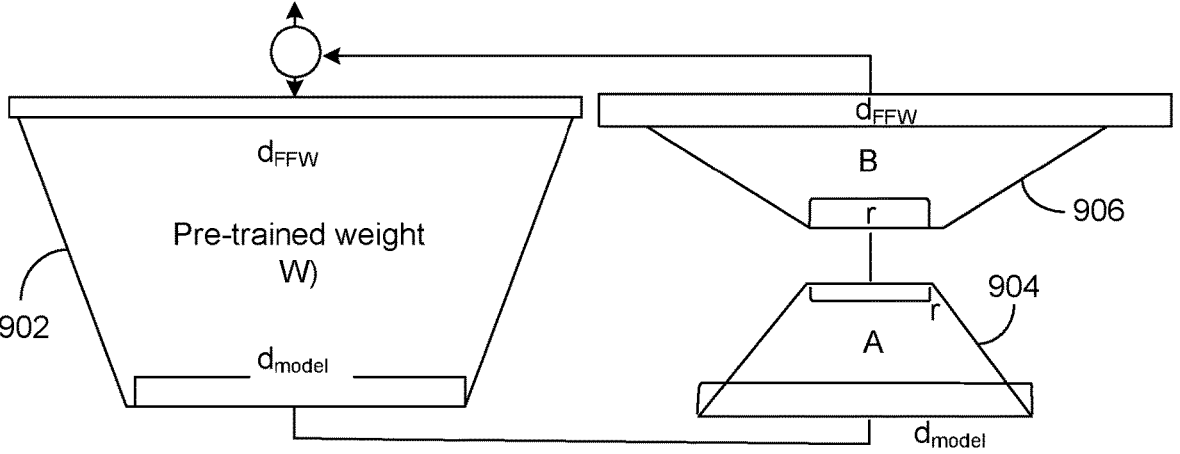
FIG. 9 is a more detailed example of a low rank adapter of FIG. 8.

25 suitable for processing text, specific examples of which are provided with respect to FIGS. 8 and 9. In the following description, the term adapter weights is used to refer collectively to all weights of the topological context adapter 712, while the term graph adapter weights refers to weights of the graph adapter 806, and the term text adapter weights refers to weights of the text adapter 808.

As illustrated and described with respect to FIG. 8, both the graph adapter weights and the text adapter weights may be trained together (and with corresponding adapter weights of the topological context adapter 714), while remaining transformer weights of the layers 704, 706, 708, 710 are held frozen at previously determined values. Consequently, such training of the graph adapter weights may be performed in a customized, efficient manner.

In FIG. 8, an event graph 810, including a root cause node 812 and surrounding topology nodes 814, is illustrated as being input to the graph adapter 806. More specifically, the event graph 810 is illustrated as being input to graph embedding layers 816. As described in detail, below, the graph embedding layers 816 may include one or more layers for determining an embedding of the event graph 810, so that the resulting graph embeddings may be processed by a graph attention network 828.

In the example of FIG. 8, the graph embedding layers 816 include a vector feature embedding layer 818. Conceptually, the vector feature embedding layer 818 is designed to capture node features of individual nodes of the event graph 810. For example, node features may include, for a given node, an associated device type (e.g., router, switch, or load balancer), application, or business service, as well as associated details that may be specific to the individual device (e.g., network interface characteristics). As referenced above, some device features may be determined from the corresponding topology data 124 and/or knowledge graph 126 of FIG. 1B.

Then, the vector feature embedding layer 818 may be configured to convert such node features into a corresponding embedding(s), providing a numerical representation of the above-referenced types of node features, in which similar node features will be embedded close to one another within the vector space of the embeddings. For example, nodes for two different types of routers may have similar vector feature embeddings, while a node for a virtual machine and a Kubernetes port may have dissimilar vector feature embeddings.

In an example formal representation, for each node $v_j \in Vi$ in the subgraph $g_i$, a raw feature vector can be embedded into a shared feature space (of the same dimension $d_h$) with its raw feature vector $x_j$, which can be denoted as:

$$e_j^{(x)} = \text{Embed } (x_j) \in R dh \times 1$$

An absolute role embedding layer 820 may be configured to embed features related to a role of a node within a graph. For example, a node's role may relate to various types of graph invariants, such as vertices, edges, and degree. For example, a graph node may provide the role of a hub, a spoke, or a leaf node. Therefore, for example, a hub node with many edges will have an absolute role embedding similar to another hub node with a number of edges, and both may have dissimilar embeddings with respect to a leaf node with a single edge.

The Weisfeiler-Lehman (WL) algorithm may be used to label the nodes according to their structural roles in the

26 graph data, with nodes having identical roles being labelled with the same code. Formally, for node $v_j \in V_i$ in the sampled subgraph, its WL code can be denoted as $WL(v_j) \in N$, which can be pre-computed based on the complete graph and is invariant for different sampled subgraphs:

$$e_j^{(r)} = \text{Embed } (WL(v_j))$$

A relative positional embedding layer 822 determines embeddings based on relationships between nodes, i.e., based on relationships between underlying devices, interfaces, applications, services, or other node features, as well as relative orders or sequences of the nodes and features. For example, a relative positional embedding may identify a router connected to an interface, or vice versa, in a causal manner. Thus, for instance, a generated narrative may more easily determine potential causations within an analyzed graph, which may or may not be explicitly reflected within the graph being processed. That is, although various types of causation may be determined and reflected in a graph using the techniques of FIG. 1B, the relative positional embedding layer 822 (similar to other embeddings) may further determine similarities between many different pairs and sequences of nodes across many analyzed graphs, to determine and characterize such relative positions more completely and more accurately.

The WL-based role embeddings referenced above may be used to capture global node role information in embeddings. For example, a relative positional embedding may be introduced to extract local information in a subgraph based on the placement orders of the serialized node list discussed above. Formally, based on that serialized node list, the position of $v_j \in V_i$ can be denoted as $P(v_j)$. Because $P(v_i)=0$ by default and nodes closer to $v_i$ will have a small positional index, and, furthermore, $P(\bullet)$ represents a variant position index metric, then for the identical node $v_j$, its positional index $P(v_j)$ will be different for different sampled subgraphs:

$$e_j^{(p)} = \text{Position} - \text{Embed } (P(v_j))$$

A hop embedding layer 824 produces embeddings reflecting relative distances between graph nodes. For example, such hop embeddings may capture or characterize whether a pair of nodes are separated by 0, 1, 2, or more intervening nodes. Nodes that are connected by multiple intervening paths (and corresponding numbers of nodes) may also be characterized, and/or a shortest-available connection may be effectively identified.

Hop-based embedding can be treated as a balance between absolute role embedding (for global information) and intimacy-based relative positional embedding (for local information). Formally, for node $v_j \in V_i$ in the subgraph $g_i$, relative distance in hops relative to $v_i$ in the original input graph may be denoted as $H(v_j; v_i)$, which can be used to define an embedding vector as:

$$e_j^{(d)} = \text{Embed } (H(v_j; v_i))$$

Calculated embeddings may then be aggregated and passed to an input layer 826 for a graph attention network 828. More specifically, using the computed embedding vectors defined above, initial input vectors for nodes may be defined, e.g., as $v_j$, in the subgraph gi as follows:

$$h_j^1 = \text{Aggregate}(e_j^{(x)}, e_j^{(r)}, e_j^{(p)}, e_j^{(d)}).$$

The graph attention network 828, similarly in concept to the multi-head attention layer 704, processes input vectors to determine and identify particular nodes, edges, or graph portions for particular attention when generating a narrative or a remediation for the graph being processed. Also similar to the structure and approach of the transformer layer 702, skip connections 832 may be used to provide input values of vector(s) h, at output layers 830.

During training of the graph adapter 806, an error between the generated graph narrative (or remediation) output from the graph adapter 806 may be compared to a labeled, ground truth narrative for the graph being processed, so that an error $\Delta h$ between the ground truth narrative and the generated narrative may be determined. Then, backpropagation may be used to proceed back through the graph attention network 828 and the graph embedding layers 816, to correct adapter weights (including vector embedding weights) for the graph adapter 806 in a manner that operates to minimize the error $\Delta h$. Over many such processing cycles, the error may thus be reduced, and the graph adapter 806 may be trained to conform to corresponding training data. Then, during inference operations, the graph adapter 806 may operate to provide accurate and complete narratives for newly received graphs.

Similar comments apply to the text adapter 808. Specifically, an input layer 834 may be trained to generate a hidden value vector representation for forwarding to a feed-forward down-project 830, for further processing by a nonlinear layer 838 and a feed-forward up-project 840. As with the graph adapter 806, output layer 842 provides an output $\Delta h$ that may be added to the original value h through skip connection 844 and modified during subsequent backpropagation operations to minimize an error in operations of the text adapter 808. Then, a feed-forward neural network layer 846, similar to the feed-forward neural network layer 708, may be used to combine outputs of the graph adapter 806 and the text adapter 808, for forwarding within the larger pipeline of the transformer layer 702 of FIG. 7.

In the example of FIG. 8, the text adapter 808 utilizes a low-rank adapter (LoRa) approach in which the various model weights are represented as a matrix W of weights, where the matrix W has a degree d that corresponds to the larger LLM of which the topological context adapter 712 is a part. In other words, the matrix W includes the pre-trained weights of the larger LLM, which may advantageously be frozen for purposes of training the topological context adapter 712. The matrix W is not shown separately in FIG. 8, but is represented in FIG. 9 as weight matrix 902.

Such a matrix W may typically have a relatively large dimension d, but may be decomposed into two smaller matrices A and B, shown in FIG. 9 as low-rank matrix 904 (corresponding to the feed-forward down project 830 of FIG. 8) and low-rank matrix 906 (corresponding to the feed-forward up project 840 of FIG. 8). That is, a rank r of the two matrices 904, 906 may be much smaller than a rank of the original matrix W, but may contain a subset of weights of the matrix W that are most pertinent to training the text adapter 808. For example, the matrix W may be decomposed by keeping only linearly independent columns, while removing linearly dependent columns, which retain much of the relevant information needed for subsequent training while greatly reducing a quantity of time and processing resources needed for training.

Then, as understood from FIG. 9, the values of the weights of the matrices 904, 906 may be updated during fine-tuning training, while the pre-trained values of the original matrix 902 are held constant. As shown, the degree $d_{model}$ of inputs to the weight matrix 902 and the weight matrix 904 is the same, while the degree $d_{FFW}$ of the outputs of the weight matrix 902 and the weight matrix 906 to a subsequent feed-forward neural network layer are the same, so that the combination of vectors modified by the weight matrix 902 and the weight matrices 904, 906 may be easily combined.

Further, as the rank r is much less than the rank d, the fine-tuning training may be performed much faster and more efficiently than would be required if the original matrix W were updated. Put another way, a weight after fine-tuning may be written as $W_0$ (pre-trained weight)$+\Delta W$ (updates to the weight), where updates to the weight ($\Delta W$) have a low intrinsic rank, and so that a resulting fine-tuned weight may be provided as $W_0 + \Delta W = W_0 + BA$, rank $r >> \min(d_{FFW}, d_{model})$.

Figure 10:
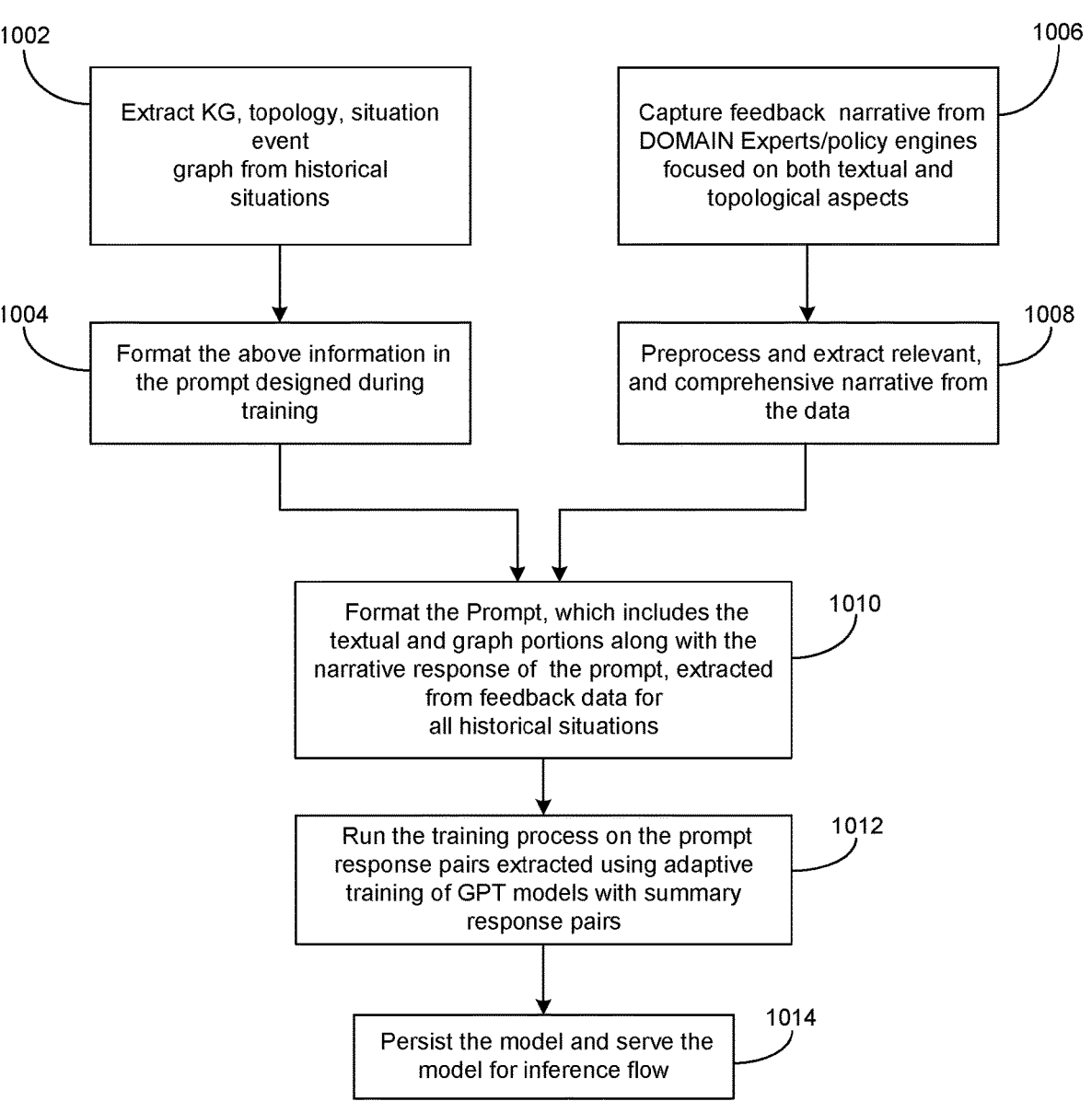
FIG. 10 is an example flowchart illustrating operations for training a large language model to generate a narrative using the example transformer layers of FIGS. 7-9.

FIG. 10 is an example flowchart illustrating operations for training a large language model to generate a narrative using the example transformer layers of FIGS. 7, 8, and 9. During training, historical situations may be used to determine and extract knowledge graph (KG), topological graph data, and situation event graph(s) (1002). This extracted data may be formatted for inclusion within a prompt for the LLM to be trained (1004). Examples of how to format such a prompt are provided below, e.g., with respect to FIGS. 11A and 11B.

In parallel, corresponding narrative(s) may be captured from domain experts or relevant policy engines (which, e.g., enforce access rules for network resources/data), with a focus on both textual and topological aspects of the included narratives (1006). Collected data may be pre-processed and relevant, comprehensive narratives may be extracted (1008).

Prompt-response pairs may then be formatted, including both textual and graph portions, along with corresponding narrative(s), as previously extracted (1010). The training process may thus be executed using the prompt-response pairs (1012), e.g., to train the topological context adapters 712, 714 of FIGS. 7 and 8. The resulting fine-tuned model may thus be persisted for later use during inference flow (1014).

FIG. 11A illustrates a template 1102 for training operations in the example of FIG. 10. FIG. 11B illustrates a sample response 1104 for training operations in the example of FIG. 10, corresponding to the template 1102 of FIG. 11A.

In FIG. 11A, a section 1106 of the template 1102 provides a generative TaskID for generating a situation narrative, along with an instruction to determine a situation narrative, as shown. A text context of "The root cause of this situation is <rootCausalEventMessage>," and "the responsible device is <CI_name>" may be provided. An impact statement of "The impacted service health events are <Service Health Event Message>." A change request associated with the situation may be included, such as upgrading new software into a relevant product. Finally in section 1106, an option for inclusion of a date of occurrence may be included.

Further in FIG. 11A, a graph context 1108 may be provided, along with the text context 1106, as described above, e.g., with respect to the event text 146c and the situation event graph 146a of FIG. 1A. In FIG. 11A, a simplified graph context is provided for the sake of conciseness. Techniques for providing a more detailed graph context are provided below, e.g., with respect to FIGS. 16 and 17. A response 1110 in FIG. 11A is illustrated as including a root cause narrative, a past resolution summary, and an impact narrative.

As noted above, FIG. 11B illustrates a sample 1104 corresponding to the template of FIG. 11A. Consequently, section 1112 provides a generative TaskID for generating a situations narrative, along with an instruction to determine a situation narrative, corresponding to the section 1106 of FIG. 11A.

A text context section 1114 provides a specific example of a root cause of "CPU utilization had breached a critical threshold of 50," identifies a responsible device, and identifies impacted service health events (e.g., "response time of the USA transactions is critically high," along with providing a relevant date of Jan. 10, 2023.

A graph context 1116 is illustrated, again in simplified form, representing the type of causal graph illustrated and described below with respect to FIG. 16. A response section 1118 provides a specific root cause narrative of "CPU utilization on cam-pg31.bmc.com is the root cause of the situation," with a past resolution summary of "It can be resolved by restarting the database and increasing CPU resources," and an impact narrative of "It had resulted in service degradation by response time for USA transaction since according to the service topology this doesn't have high availability so it might cause a critical failure" (similar to the example of FIG. 4, described above).

Figure 12:
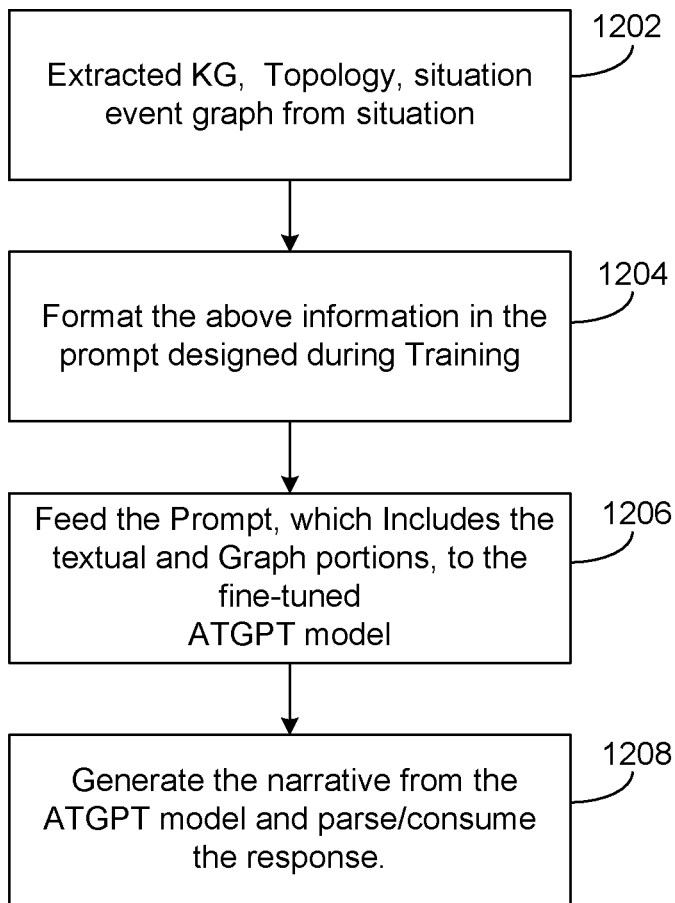
FIG. 12 is an example flowchart illustrating operations for executing the trained large language model of FIG. 10.

FIG. 12 is an example flowchart illustrating operations for executing the trained LLM of FIG. 10. In FIG. 12, knowledge graph data, topological graph data, and situation event graph(s) may be extracted for a given situation (1202). This extracted data may be formatted for inclusion within a prompt designed during training, e.g., the prompt template of FIG. 11A, to obtain a prompt such as the sample prompt of FIG. 11B (1204).

The resulting prompt, including both textual and graph portions, may then be fed to the previously fine-tuned model (1206). A corresponding narrative may thus be generated by the model, which may then be parsed/consumed, or otherwise used in a desired manner (1208).

Figure 13:
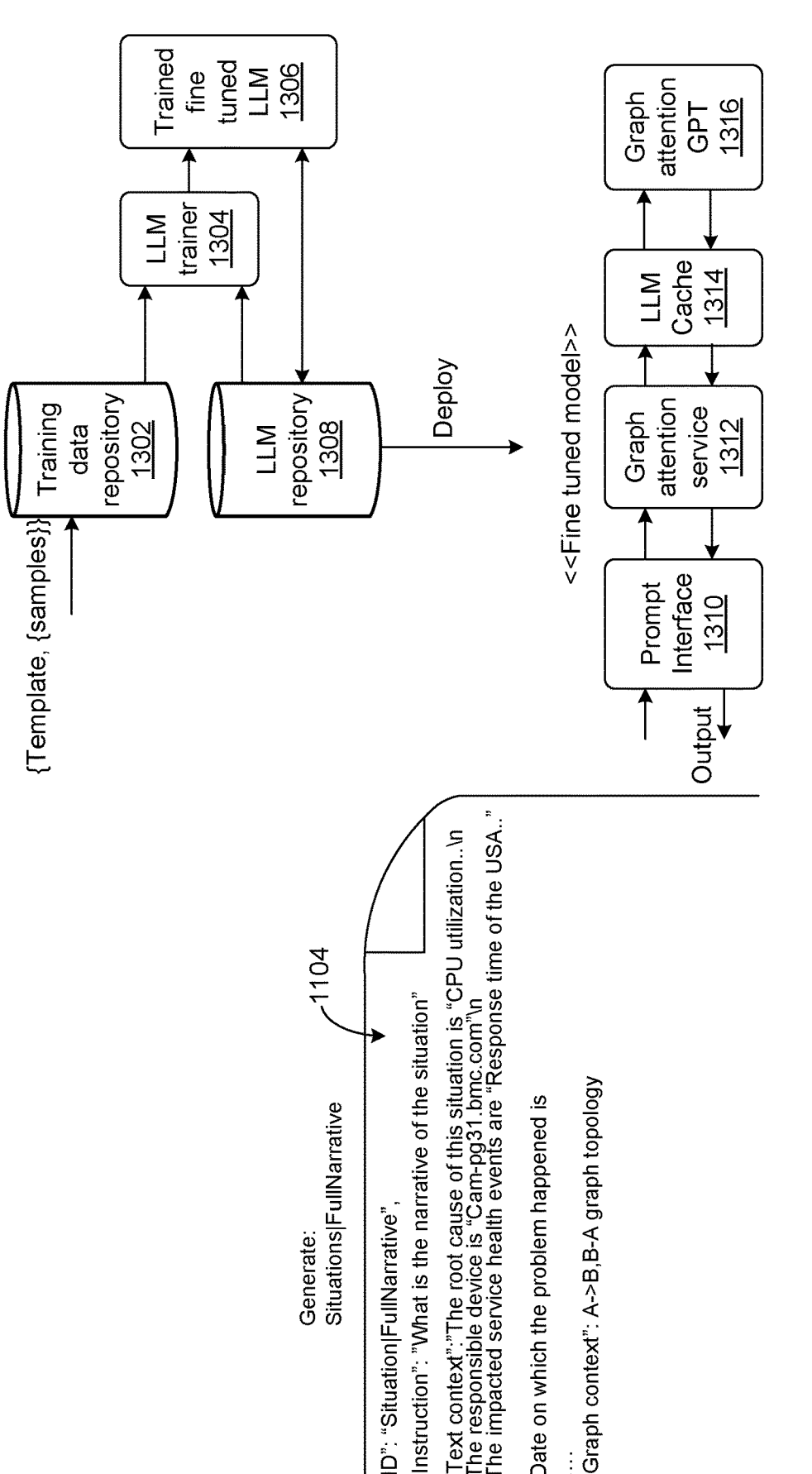
FIG. 13 is a block diagram illustrating an example training and deployment of the large language model of FIGS. 10 and 12.

FIG. 13 is a block diagram illustrating an example training and deployment of the large language model of FIGS. 10 and 12, using the sample prompt 1104 of FIG. 11B during the deployment.

In FIG. 13, a training data repository 1302 receives samples in accordance with the constructed template of FIG. 11A, along with, e.g., relevant model ID, message/text context, and topology context. ALLM trainer 1304 may be configured to load data from the training data repository 1302, as well as from a LLM repository 1308. The LLM repository 1308 may be used to store all base (not yet fine-tuned) models, as well as an individual trained/fine-tuned LLM(s) 1306, as shown.

A resulting fine-tuned LLM may be deployed to process, e.g., the prompt sample 1104. Specifically, a prompt interface 1310 may be configured to receive the prompt sample 1104 with included text context and graph context, for forwarding with a relevant template ID and model ID to a graph attention service 1312. The graph attention service 1312 provides a routing service based on the template ID/model ID. If the relevant LLM is already loaded from the LLM repository 1308, the graph attention service 1312 may route to a LLM cache 1314 storing the loaded LLM. Otherwise, the graph attention service 1312 may load the identified LLM from the LLM repository 1308. Thus, the LLM cache 1314 provides a service configured to facilitate use of most-recently used LLMs and associated prompts. Therefore, such LLMs and prompts may be processed rapidly if used multiple times in a short time period.

In FIG. 13, a graph attention GPT 1316 refers to a final loaded LLM for a relevant model ID/template ID, which executes to provide a new prompt completion. The subsequent response may then be provided as output.

FIG. 14 is an example flowchart illustrating operations for training a LLM to generate a remediation using the example transformer layers of FIGS. 7-9. In FIG. 14, during training, historical situations may be used to determine and extract knowledge graph, topological graph data, and situation event graph(s) (1402). This extracted data may be formatted for inclusion within a prompt for the LLM to be trained (1404). Examples of how to format such a prompt are provided above in the context of narrative generation, e.g., with respect to FIGS. 11A and 11B.

In parallel, corresponding historical situations and corresponding IT ticket/service manager data may be captured, with a focus on both textual and topological aspects of the included remediations (1406). Collected data may be preprocessed and relevant, actionable remediation data may be extracted (1408).

Prompt-response pairs may then be formatted, including both textual and graph portions, along with corresponding remediations, as previously extracted from IT ticket data (e.g., worklogs) (1410). The training process may thus be executed using the prompt-response pairs (1412), e.g., to train the topological context adapters 712, 714 of FIGS. 7 and 8, for all available prompt-remedy pairs. The resulting fine-tuned model may thus be persisted for later use during inference flow (1414).

Figure 15:
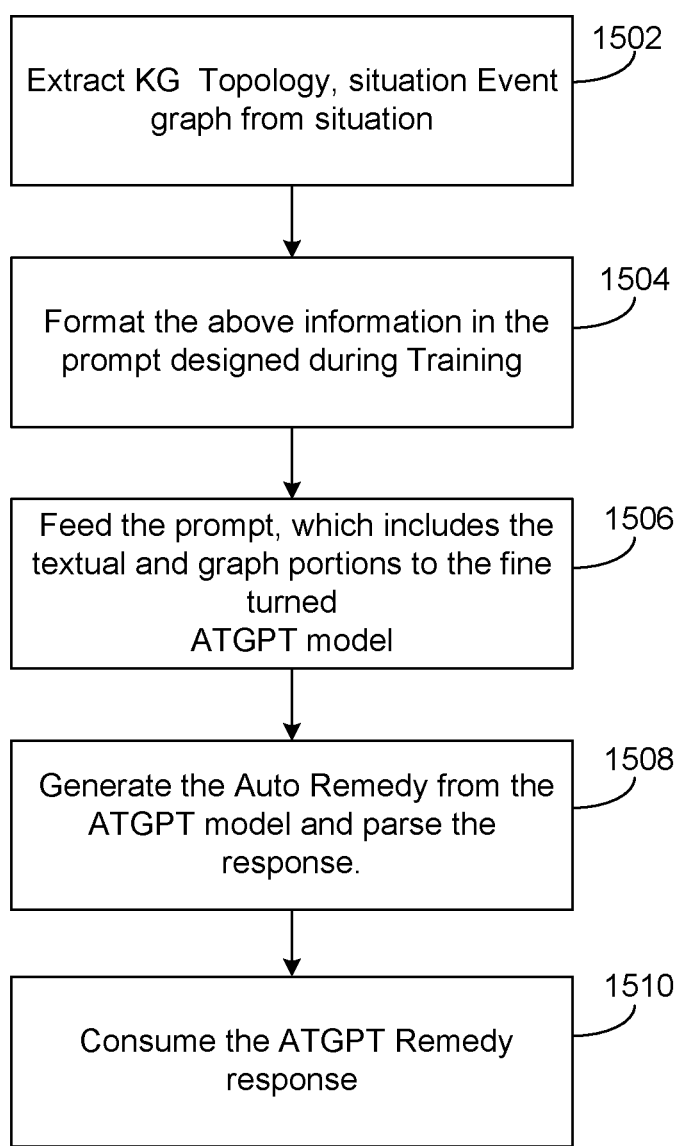
FIG. 15 is an example flowchart illustrating operations for executing the trained large language model of FIG. 12.

FIG. 15 is an example flowchart illustrating operations for executing the trained LLM of FIG. 12. In FIG. 15, knowledge graph data, topological graph data, and situation event graph(s) may be extracted for a given situation (1502). This extracted data may be formatted for inclusion within a prompt designed during training (1504).

The resulting prompt, including both textual and graph portions, may then be fed to the previously fine-tuned model of FIG. 14 (1506). A corresponding remediation may thus be generated by the model, which may then be parsed and consumed, including executing an automated remediation script, or otherwise used in a desired manner (1508).

Figure 16:
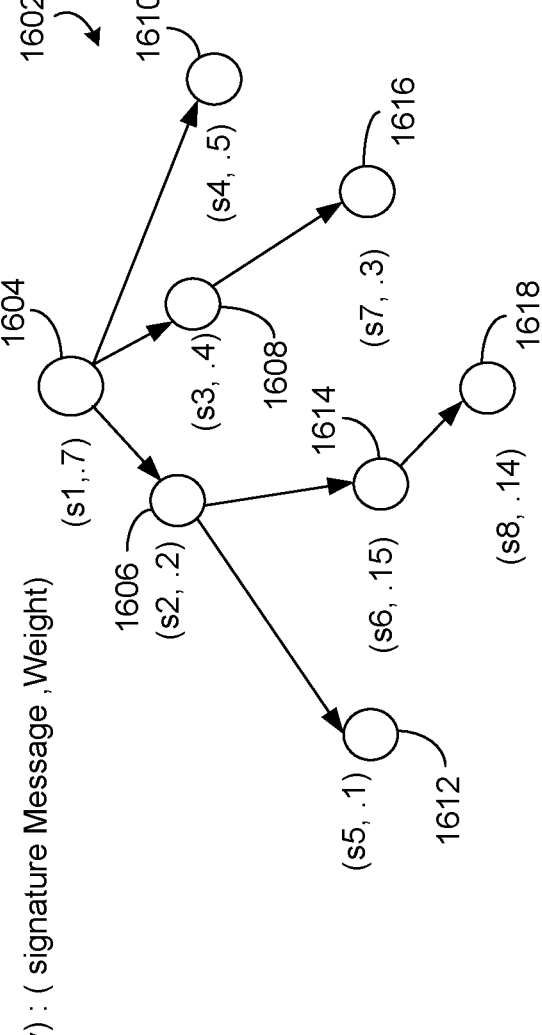
FIG. 16 illustrates an example graph for input into the system of FIG. 1A.

FIG. 16 illustrates an example graph for input into the system of FIG. 1A. FIG. 17 illustrates an example topological input into the system of FIG. 1A. As noted above, the example graph inputs, e.g., of FIGS. 11A, 11B were illustrated in a simplified manner, while FIGS. 16 and 17 provide more detailed examples.

In FIG. 16, an example situation event graph 1602, conceptually similar to the situation event graph of FIG. 5B, is illustrated that includes a root cause node 1604 (s1), a first level node 1606 (s2), a first level node 1608 (s3), and a first level node 1610 (s4). The situation event graph 1602 further includes a third level node 1612 (s5) and a third level node 1614 (s6) connected to the node 1606, and a third level node 1616 (s7) connected to the node 1608. A fourth level node 1618 (s8) is connected to the third level node 1614.

As described herein, the situation event graph 1602 of FIG. 16 generally relates incidents occurring on different components with causal relationships between the incidents and components. Techniques described and illustrated with respect to FIG. 16 may be used to generate graph context in textual form, which may then be included in an LLM prompt along with the text context (already in textual form).

In FIG. 16, as shown, each node may be associated with a signature message and associated causal weight (s, w). A message picked from a given node may include, e.g., a first or subsequent event message. Analysis may traverse from the root cause node to each leaf node(s). At each level, a 'caused' keyword may be used to indicate a next level, while at each individual level, messages may be concatenated with the 'and' keyword and arranged from highest to lowest causal score.

Thus, for example, in FIG. 16, a constructed prompt message may be written as, "S1 caused (s4 and s3 and s2) caused (s7 and s6 and s5) caused s8." Or, in a more specific example, as "CPU Utilization>80% for 1 min caused Response Time>28000 ms."

In addition, FIG. 17 illustrates a conceptually similar representation of topology graph context, similar to the example of FIG. 5A. That is, FIG. 17 represents extracted representations of topological devices on which the situation event graph of FIG. 16 (similar to the example of FIG. 5B) occurs, including extracted relationships between components as represented in FIG. 5A. In other words, FIG. 17 provides a formulation for representing relationships between, e.g., network devices, business services, and software components.

In FIG. 17 a code portion 1702 includes a node {list} that characterizes an individual node, e.g., individual devices in a topology graph. As shown, each node may be characterized by properties such as name, type, and kind. Other characteristics, such as identifiers, attributes, and associated definitions may also be included.

A code portion 1704 illustrates an example representation of an edge {list} characterizing an individual link between nodes, e.g., between device nodes. As shown, each such edge or link may be characterized by a source id (src_id) of a node from which the relationship starts, a target id (tgt_id) of a node at which the relationship ends, and a relationship id (rel_id) identifying the individual relationship.

The relationship may be further characterized by defining a 'kind' of the relationship. In the illustrated examples, a link(s) may be of a 'cloudservice' kind or a 'communication' kind.

FIG. 17 provides a simplified example, and a given topology representation may include many nodes and links represented by code portions 1702 and 1704 in FIG. 17. As described above, by representing a situation event graph and a topological graph as shown in the examples of FIGS. 16 and 17, respectively, the LLMs of FIGS. 1A, 1C, 1D and FIGS. 7 and 8 may be enabled to understand graph contexts using the techniques described above.

For example, a relevant portion of an entire topology graph may be determined, e.g., from a number, type, and/or characteristic(s) of a situation event graph is being processed. For example, the above-referenced type of LLM(s) may determine a portion of a topology graph requiring attention to generate a narrative or remediation for a given situation event graph. For example, as in the examples of FIGS. 3 and 4, above, a relevant trained LLM may determine a portion of the relevant topology graph requiring attention to determine whether high availability and/or redundancy is available or absent. Many other such topological patterns may be determined from the available training data, so that at inference time an individual situation event graph may be processed using relevant portions of a topology graph, and, likewise, relevant portions of a knowledge graph, in the context of which the situation event graph occurs.

As referenced above, a network topology and knowledge graph can be analyzed together with individual situation event graphs, which are themselves associated with event graph textual data. In described example situations, causal relationships between entities are captured for which events are generated based on performance metrics. Each node in the graph may refer to an event(s) of an entity or entities. Every relationship may be given a weight indicating how strongly a source entity can cause issues in a target entity. A situation may thus be identified by analyzing a set of collected events to determine a group or cluster of events that reflect the aggregate impact of all the events as a directed causal event graph corresponding to situations, which can then be passed through a root cause generator to identify, within the directed causal event graph of situation, one or more event signatures that are most likely to have caused the entire situation.

In the topological context adapter architecture described herein, once sufficient labelled data is captured for situation event graphs enriched with topology and related narratives, small trainable sub modules may be inserted inside a GPT or similar LLM model. The GPT model may then be fine-tuned by keeping the original weights frozen and training the topological context adapter. Inside the topological context adapter, the graph data may be passed through multiple graph embeddings and then to a graph attention network whereas the textual data may be transformed through a low-rank adapter. Both the graph attention network output and low-rank adapter output may be merged using a feed forward layer and passed to the next layer in the GPT model.

Implementations of the various techniques described herein may be implemented in digital electronic circuitry or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers, including mainframes and distributed servers, at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may, or be operatively coupled to, receive data from or transfer data to, or both, one

33 or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:
   determine an event graph of a causal chain of events representing a situation within a network, the event graph including event text characterizing at least one event of the causal chain of events;
   process the event graph using a large language model that includes at least one topological context adapter that includes a graph adapter and a text adapter, including processing the event graph with the graph adapter and the event text with the text adapter, wherein the at least one topological context adapter is trained using existing narratives describing past situations; and
   combine outputs of the graph adapter and the text adapter to generate, from the large language model, a narrative of the situation that explains the causal chain of events.

2. The computer program product of claim 1, wherein the instructions are further configured to cause the at least one computing device to:
   convert the event graph to a text representation of the event graph for providing to the graph adapter.

34

3. The computer program product of claim 2, wherein the graph adapter includes:
   graph embedding layers configured to convert the text representation of the event graph into graph embeddings; and
   a graph attention network configured to process the graph embeddings.

4. The computer program product of claim 3, wherein the graph embedding layers include a vector feature embedding layer configured to convert node features of each node of the event graph and of proximate topology nodes of a network topology into a shared feature space.

5. The computer program product of claim 3, wherein the graph embedding layers include an absolute role embedding layer configured to convert a node role of each node of the event graph and of proximate topology nodes of a network topology into a shared feature space.

6. The computer program product of claim 3, wherein the graph embedding layers include a relative positional embedding layer configured to convert a relative position of each node of the event graph and of proximate topology nodes of a network topology into a shared feature space.

7. The computer program product of claim 3, wherein the graph embedding layers include a hop embedding layer configured to convert a hop distance between each pair of nodes of the event graph and of proximate topology nodes of a network topology into a shared feature space.

8. The computer program product of claim 1, wherein the text adapter includes a low rank adapter.

9. The computer program product of claim 1, wherein the instructions are further configured to cause the at least one computing device to:
   train the at least one topological context adapter including freezing weights of the large language model while updating weights of the at least one topological context adapter using the existing narratives.

10. The computer program product of claim 1, wherein the instructions are further configured to cause the at least one computing device to:
   combine the outputs of the graph adapter and the text adapter within the at least one topological context adapter using a feed forward neural network.

11. A computer-implemented method, the method comprising:
   determining an event graph of a causal chain of events representing a situation within a network, the event graph including event text characterizing at least one event of the causal chain of events;
   processing the event graph using a large language model that includes at least one topological context adapter that includes a graph adapter and a text adapter, including processing the event graph with the graph adapter and the event text with the text adapter, wherein the at least one topological context adapter is trained using existing narratives describing past situations; and
   combining outputs of the graph adapter and the text adapter to generate, from the large language model, a narrative of the situation that explains the causal chain of events.

12. The method of claim 11, further comprising:
   converting the event graph to a text representation of the event graph for providing to the graph adapter.

13. The method of claim 12, wherein the graph adapter includes:
   graph embedding layers configured to convert the text representation of the event graph into graph embeddings; and a graph attention network configured to process the graph embeddings.

14. The method of claim 11, wherein the text adapter includes a low rank adapter.

15. The method of claim 11, further comprising:

training the at least one topological context adapter including freezing weights of the large language model while updating weights of the at least one topological context adapter using the existing narratives.

16. The method of claim 11, further comprising:

combining the outputs of the graph adapter and the text adapter within the at least one topological context adapter using a feed forward neural network.

17. A system comprising:

at least one memory including instructions; and at least one processor that is operably coupled to the at least one memory and that is arranged and configured to execute instructions that, when executed, cause the at least one processor to:

determine an event graph of a causal chain of events representing a situation within a network, the event graph including event text characterizing at least one event of the causal chain of events;

process the event graph using a large language model that includes at least one topological context adapter that includes a graph adapter and a text adapter, including processing the event graph with the graph adapter and the event text with the text adapter, wherein the at least one topological context adapter is trained using existing narratives describing past situations; and combine outputs of the graph adapter and the text adapter to generate, from the large language model, a narrative of the situation that explains the causal chain of events.

18. The system of claim 17, wherein the instructions are further configured to cause the at least one processor to:

convert the event graph to a text representation of the event graph for providing to the graph adapter.

19. The system of claim 18, wherein the graph adapter includes:

graph embedding layers configured to convert the text representation of the event graph into graph embeddings; and a graph attention network configured to process the graph embeddings.

20. The system of claim 17, wherein the instructions are further configured to cause the at least one processor to:

combine the outputs of the graph adapter and the text adapter within the at least one topological context adapter using a feed forward neural network.

\* \* \* \* \*